United States Patent
Nagata et al.

(10) Patent No.: US 9,485,676 B2
(45) Date of Patent: Nov. 1, 2016

(54) WIRELESS COMMUNICATION DEVICE AND METHOD FOR SEARCHING FOR BYPASS ROUTE IN WIRELESS NETWORK

(71) Applicant: FUJITSU LIMITED, Kawasaki-shi (JP)

(72) Inventors: Nami Nagata, Kawasaki (JP); Kentaro Ikemoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 270 days.

(21) Appl. No.: 13/865,537

(22) Filed: Apr. 18, 2013

(65) Prior Publication Data

US 2013/0229911 A1 Sep. 5, 2013

Related U.S. Application Data

(63) Continuation of application No. PCT/JP2010/071296, filed on Nov. 29, 2010.

(51) Int. Cl.
*H04L 12/701* (2013.01)
*H04W 24/04* (2009.01)
*H04W 40/02* (2009.01)
*H04W 8/00* (2009.01)
*H04W 40/24* (2009.01)
(Continued)

(52) U.S. Cl.
CPC ............ *H04W 24/04* (2013.01); *H04W 40/02* (2013.01); *H04L 45/00* (2013.01); *H04L 45/16* (2013.01); *H04W 8/005* (2013.01); *H04W 40/248* (2013.01); *H04W 84/18* (2013.01)

(58) Field of Classification Search
None
See application file for complete search history.

(56) References Cited

U.S. PATENT DOCUMENTS

| 7,720,000 B2 * | 5/2010 | Yoshida .............. H04L 43/0847 370/252 |
| 8,150,337 B2 | 4/2012 | Isozu |
| 8,392,607 B2 | 3/2013 | Ishii et al. |

(Continued)

FOREIGN PATENT DOCUMENTS

| JP | 2008-245193 | 10/2008 |
| JP | 2009-147646 | 7/2009 |

(Continued)

OTHER PUBLICATIONS

International Search Report, mailed in connection with PCT/JP2010/071296 and mailed Feb. 15, 2011.

(Continued)

*Primary Examiner* — Michael J Moore, Jr.
*Assistant Examiner* — Ayanah George
(74) *Attorney, Agent, or Firm* — Fujitsu Patent Center

(57) ABSTRACT

A wireless communication device comprising: a storage configured to store identification information identifying a particular adjacent device from among the plurality of wireless communication devices that is adjacent to the wireless communication device and that transmits, to the wireless communication device, data addressed to a final destination device; a generator configured to generate search data that includes information indicating a search of a route to the final destination device; a transmitter configured to broadcast the search data to adjacent devices; and a decision unit configured to determine that a bypass route from the particular adjacent device to the final destination device is not present when data that includes information indicating that the search data does not reach the final destination device is received from all particular adjacent devices for which identification information is stored in the storage.

12 Claims, 29 Drawing Sheets

(51) Int. Cl.
   *H04L 12/761*   (2013.01)
   *H04W 84/18*    (2009.01)

(56) References Cited

U.S. PATENT DOCUMENTS

2006/0126495 A1* 6/2006 Guichard ............ H04L 12/2697
                                                      370/216
2007/0011284 A1* 1/2007 Le Roux ............. H04L 12/5695
                                                      709/223

FOREIGN PATENT DOCUMENTS

JP    4294723 B2    7/2009
JP    4573914 B2    11/2010

OTHER PUBLICATIONS

Notification of Transmittal of Translation of the International Preliminary Report on Patentability (Form PCT/IB/338, Form PCT/IB/373 & Form PCT/ISA/237), PCT/JP2010/071296, 7 pages, dated Jun. 13, 2013.

* cited by examiner

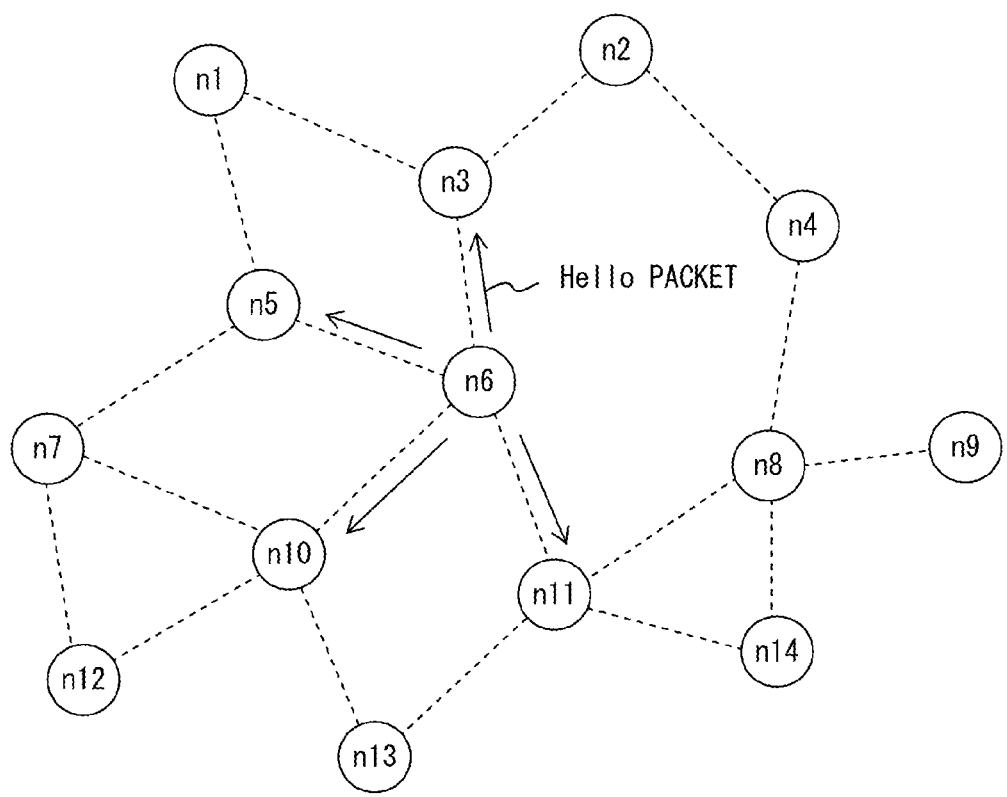
F I G. 2

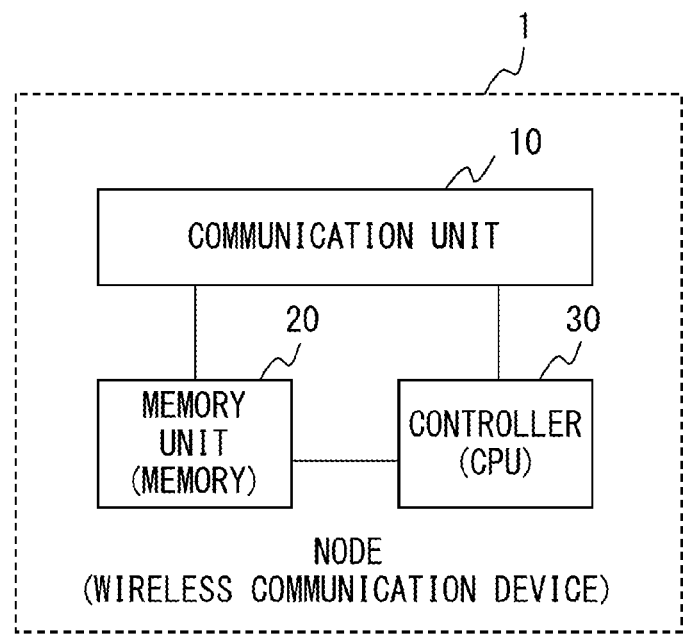
F I G. 3

| ADJACENT NODE | OUTGOING-LINK EVALUATION VALUE | INCOMING-LINK EVALUATION VALUE | LINK WEIGHT |
|---|---|---|---|
| Z | 11 | 9 | 10 |
| X | 9 | 9 | 9 |
| Y | 6 | 6 | 6 |

F I G. 6

| GLOBAL DESTINATION (GD) | LOCAL DESTINATION (LD) | ROUTE WEIGHT | LINK WEIGHT | EVALUATION VALUE |
|---|---|---|---|---|
| Z | Y | 16 | 5 | 21 |
| Z | X | 19 | 5 | 24 |
| ⋮ | | | | |

F I G. 7

| AD-HOC HEADER | GLOBAL DESTINATION (GD) | LOCAL DESTINATION (LD) | OUTGOING-LINK EVALUATION VALUE | EVALUATION VALUE | SEARCH TARGET NODE | NODE STATE |

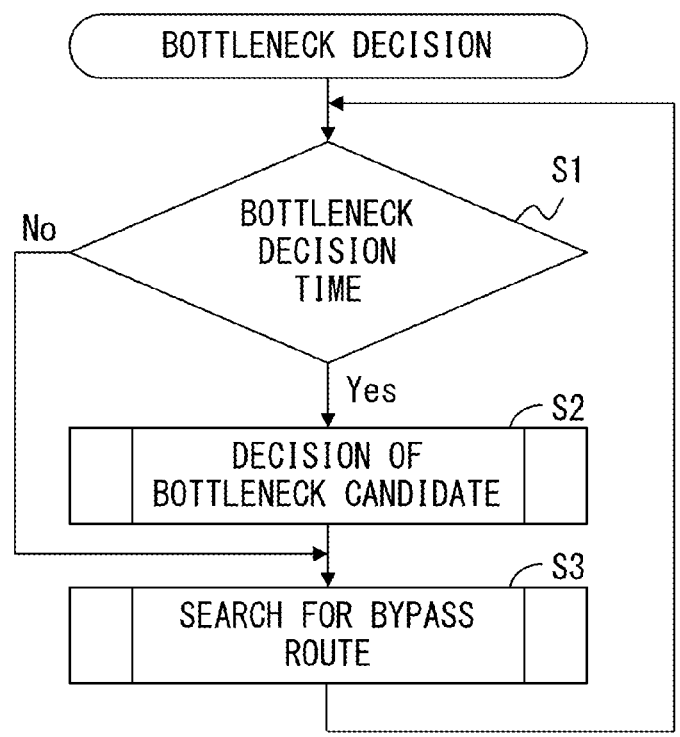
F I G. 9

| GLOBAL DESTINATION (GD) | LOCAL DESTINATION (LD) | SEARCH TARGET NODE | ADJACENT NODE | STATE (STAT) |
|---|---|---|---|---|
| GW | Y | X (ITSELF) | X (ITSELF) | 1 |
| | | | A | 1 |
| | | | B | 1 |
| | | | C | 2 |
| | | Y | X (ITSELF) | 0 |
| | | | A | 0 |
| | | | B | 0 |
| | | | C | 0 |

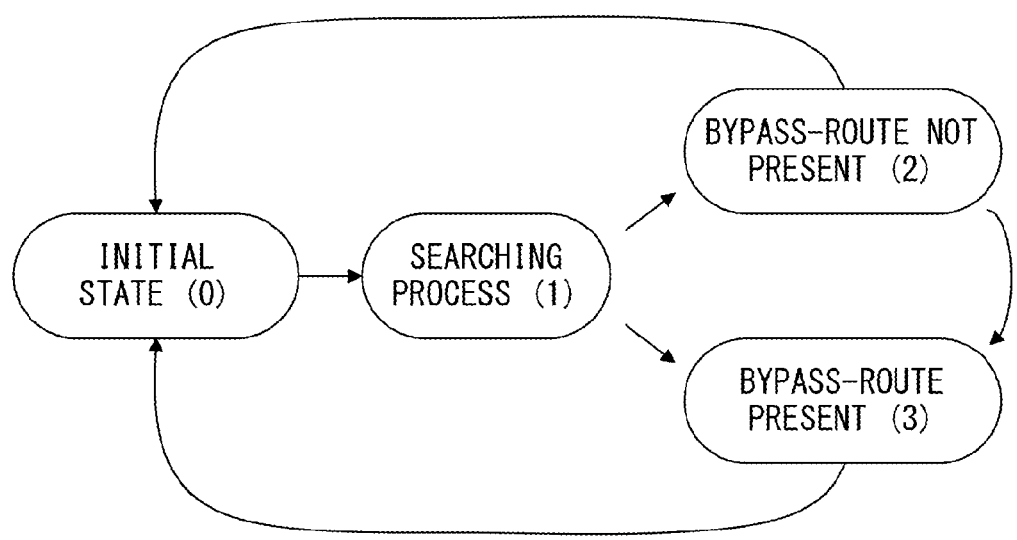
F I G. 1 3

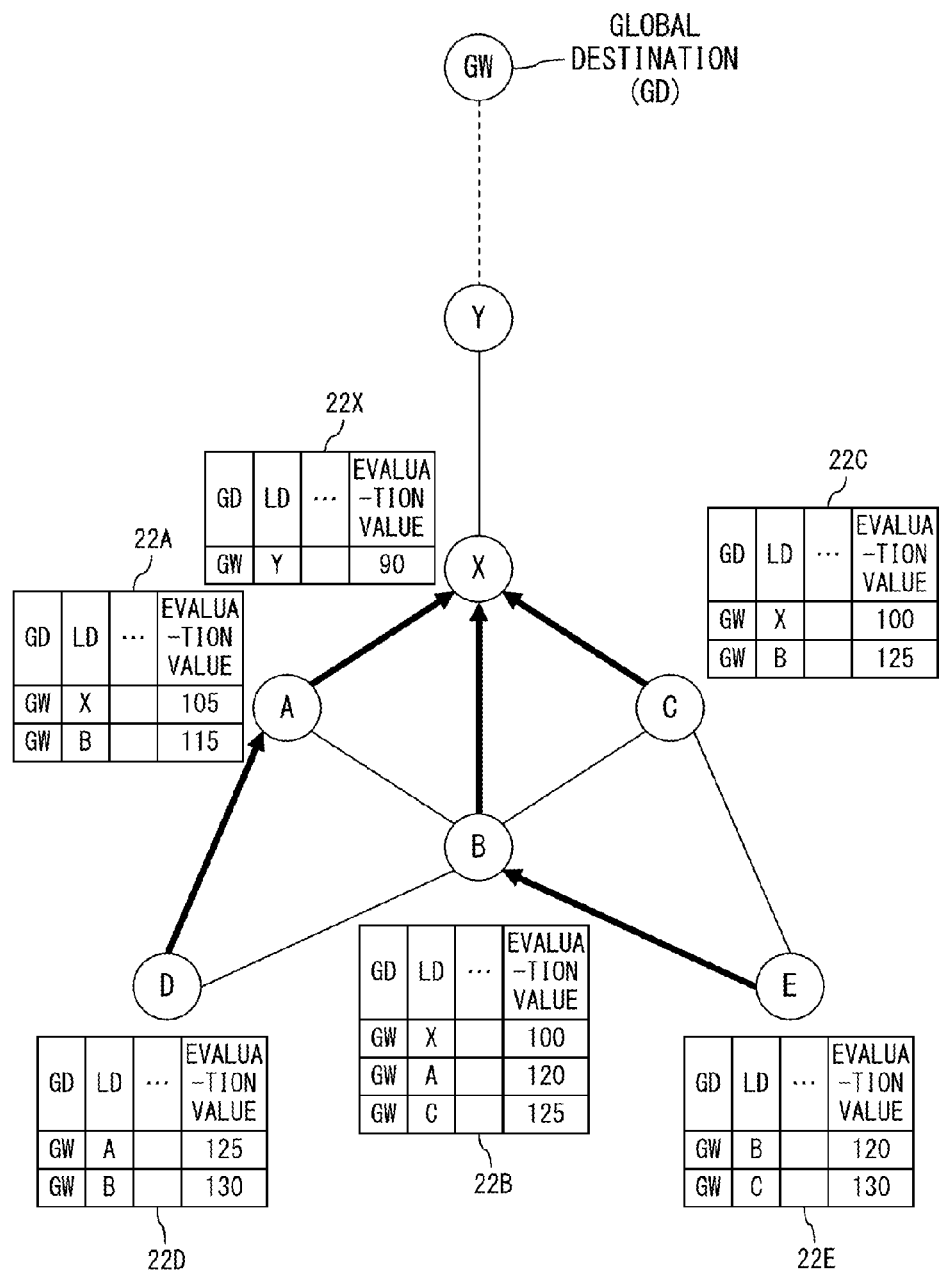
F I G. 1 4

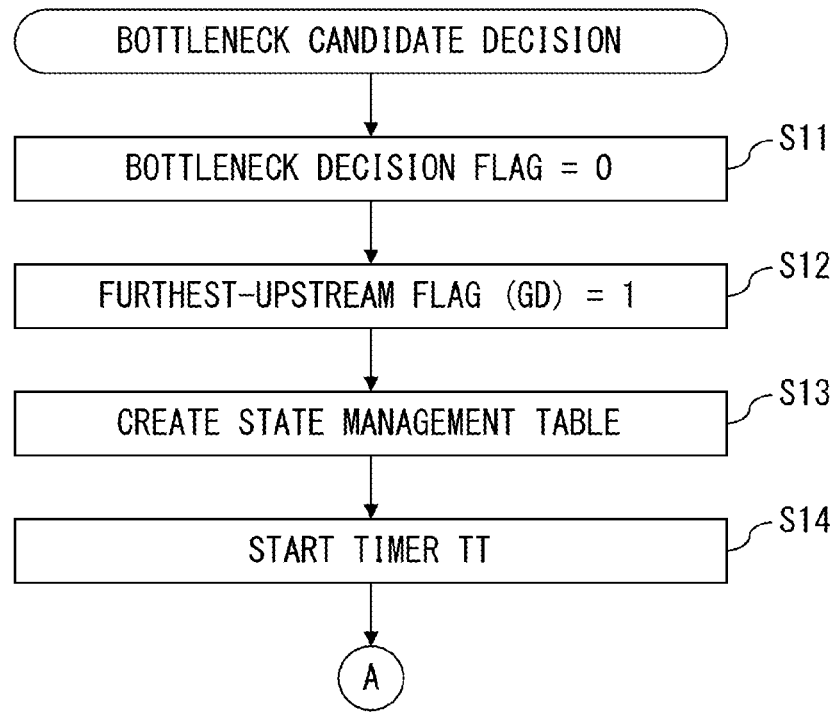
F I G. 2 4

| GLOBAL DESTINATION (GD) | LOCAL DESTINATION (LD) | SEARCH TARGET NODE | ADJACENT NODE | STATE |
|---|---|---|---|---|
| GW | Y | X (ITSELF) | X (ITSELF) | 0 |

FIG. 26A

| GLOBAL DESTINATION (GD) | LOCAL DESTINATION (LD) | SEARCH TARGET NODE | ADJACENT NODE | STATE |
|---|---|---|---|---|
| GW | Y | X (ITSELF) | X (ITSELF) | 0 |
| | | | A | 0 |
| | | | B | 0 |
| | | | C | 0 |

FIG. 26B

WIRELESS COMMUNICATION DEVICE AND METHOD FOR SEARCHING FOR BYPASS ROUTE IN WIRELESS NETWORK

CROSS-REFERENCE TO RELATED APPLICATION

This application is a continuation application of International Application PCT/JP2010/071296 filed on Nov. 29, 2010 and designated the U.S., the entire contents of which are incorporated herein by reference.

FIELD

The embodiments discussed herein are related to a wireless communication device used in a wireless network and a method for searching for a bypass route in the wireless network.

BACKGROUND

An ad-hoc network has been put into practical use as one form of a network that includes a plurality of nodes. In the ad-hoc network, autonomous route selections are made at each node. That is, each node device (or communication device) in the ad-hoc network is provided with a function operated as a router or a switch. Each node device can recognize a neighboring network configuration by transmitting and receiving, for example, a message to and from its adjacent node device. Accordingly, adopting an ad-hoc scheme (in particular, a wireless ad-hoc scheme) allows a desired network to be configured by simply arranging node devices in an environment in which a network needs to be configured without providing a network management system that manages the entire network. Moreover, in the ad-hoc network, a node is readily added or deleted so that a network configuration can be readily changed.

In the meantime, in general, a network preferably has a bypass route (or a redundant route or a substitute route) so that communication can be continued even when a fault occurs. In particular, in wireless networks, a link may be temporarily disconnected depending on a radio wave environment, so it is important to confirm the presence/absence of a bypass route in advance.

As an example, in a network illustrated in FIG. 1, to transmit data from nodes A-E to a node GW, the data needs to be transmitted via a node X. That is, there is no bypass route between the node GW and the nodes A-E. A node such as the node X through which transmitted data needs to pass before reaching a particular destination may hereinafter be referred to as a "bottleneck node".

In the network configuration illustrated in FIG. 1, when the node device X fails, the node devices A-E cannot transmit data to the node GW. In addition, when a link between the nodes X and Y is disconnected, the node devices A-E are also incapable of transmitting data to the node GW. That is, the node devices A-E have a risk of being isolated from the node GW. Accordingly, an operator who manages or administers the network needs to find a bottleneck node so as to properly provide a bypass route.

However, adding a relay node to form a bypass route increases the cost of the network. Thus, the operator needs to carefully add a relay node. Accordingly, a method is desired for precisely finding a bottleneck node.

In the ad-hoc network, however, it is difficult to correctly recognize communication routes within the entire network. Accordingly, in the ad-hoc network, it is not easy to confirm whether or not there is a bypass route for each communication route.

Providing a server computer that manages a network allows routing information of all nodes to be collected to analyze a network topology. However, in a network with many nodes, it takes a long time to collect routing information. In addition, in a wireless network, the state of links between nodes is unstable. As a result, when it takes a long time to collect routing information, a topology obtained by the server computer (i.e., a topology at the time of completion of the collecting of routing information) may not be identical with an actual topology.

As described above, in the prior art, it is difficult to precisely find a bottleneck node in a wireless ad-hoc network.

As a related art, a wireless communication device is proposed that forms an autonomous distributed wireless network by intermittently transmitting and receiving a specified communication management signal. The wireless communication device includes: a reception unit for receiving the communication management signal; an evaluation unit for evaluating a communication state of the wireless communication device in the wireless network based on a history of receiving the communication management signal by the reception unit, and a notification unit for providing a notification corresponding to an evaluation result of the communication state by the evaluation unit (e.g., Japanese Laid-open Patent Publication No. 2009-147646).

As another related art, a network control device is proposed that includes bottleneck estimation means for estimating as a bottleneck candidate a relay device with a transmission error rate of a transmission data link that is greater than a transmission error rate of a reception data link from among a plurality of relay devices in an ad hock network (e.g., International Publication Pamphlet No. WO2009/028185 (Japan Patent No. 4294723)).

SUMMARY

According to an aspect of the embodiments, a wireless communication device is used in a wireless network that includes a plurality of wireless communication devices. The wireless communication device includes: a storage configured to store identification information identifying a particular adjacent device from among the plurality of wireless communication devices that is adjacent to the wireless communication device and that transmits, to the wireless communication device, data addressed to a final destination device; a generator configured to generate search data that includes information indicating a search of a route to the final destination device; a transmitter configured to broadcast the search data to adjacent devices; and a decision unit configured to determine that a bypass route from the particular adjacent device to the final destination device is not present when data that includes information indicating that the search data does not reach the final destination device is received from all particular adjacent devices for which identification information is stored in the storage.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates a configuration of a wireless network in accordance with an embodiment.

FIG. 3 illustrates a configuration of a node device.

FIG. 6 illustrates an example of a link table.

FIG. 7 illustrates an example of a routing table.

FIG. 8 illustrates a format of a Hello packet.

FIG. 9 is a flowchart illustrating an outline of a method for searching for a bypass route in accordance with an embodiment.

FIG. 12 illustrates an example of a state management table.

FIG. 13 illustrates state transitions of a node device.

FIG. 14 illustrates an example of an ad-hoc network.

FIG. 24 and FIG. 25 are flowcharts illustrating a bottleneck candidate decision process.

FIG. 26A and FIG. 26B illustrate examples of updating of a state management table.

DESCRIPTION OF EMBODIMENTS

FIG. 2 illustrates a configuration of a wireless network in accordance with an embodiment. The wireless network in accordance with the embodiment is an ad-hoc network and is connected to a plurality of wireless communication devices. Each of the wireless communication devices may hereinafter be referred to as a "node device" or simply as a "node". In the example illustrated in FIG. 2, the wireless network includes nodes n1 to n14.

In FIG. 2, dashed lines connecting nodes indicate wireless links. As an example, the node n6 has wireless links connected to the nodes n3, n5, n10 and n11. That is, a radio wave (i.e., a radio signal) transmitted from the node n6 reaches the nodes n3, n5, n10 and n11, and radio waves respectively transmitted from the nodes n3, n5, n10 and n11 reach the node n6. The following descriptions will be given on the premise that a set of nodes connected to each other via a wireless link are "adjacent" to each other. That is, the nodes n3, n5, n10 and n11 are adjacent to the node n6. In other words, the nodes n3, n5, n10 and n11 are "adjacent nodes" of the node n6.

Each node periodically broadcasts a Hello packet. In the embodiment, however, "broadcast" does not mean transmitting a packet to all nodes but means transmitting a packet to all adjacent nodes. Accordingly, as an example, the node n6 transmits a Hello packet to the nodes n3, n5, n10 and n11. The nodes n3, n5, n10 and n11 do not forward the Hello packet received from the node n6 to another node.

Hello packets are used to report the presence of a node to another node. As an example, when the node n6 broadcasts a Hello packet, the nodes n3, n5, n10 and n11 receive this Hello packet. Accordingly, the node n3 recognizes that the node n6 is present as an adjacent node. Similarly, the nodes n5, n10 and n11 recognize that the node n6 is present as an adjacent node.

As described above, Hello packets are transmitted from each node. Accordingly, as an example, when the node n3 transmits a Hello packet, the nodes n1, n2 and n6 receive this Hello packet. In this case, the nodes n1, n2 and n6 recognize that the node n3 is present as an adjacent node. In this way, each node recognizes its adjacent node.

FIG. 3 illustrates a configuration of a node device (i.e., a wireless communication device). A node device 1 includes a communication unit 10, a memory unit 20, and a controller 30. The communication unit 10 includes an antenna, a transmitter, and a receiver and provides a wireless interface. The memory unit 20 is, for example, a semiconductor memory and is used by the controller 30. The memory unit 20 includes a nonvolatile memory. The controller 30 includes a CPU and controls an operation of the node device 1. Although not particularly illustrated, the node device 1 may include an input interface to which an input device is connected and/or an output interface to which an output device is connected.

Figure 1:
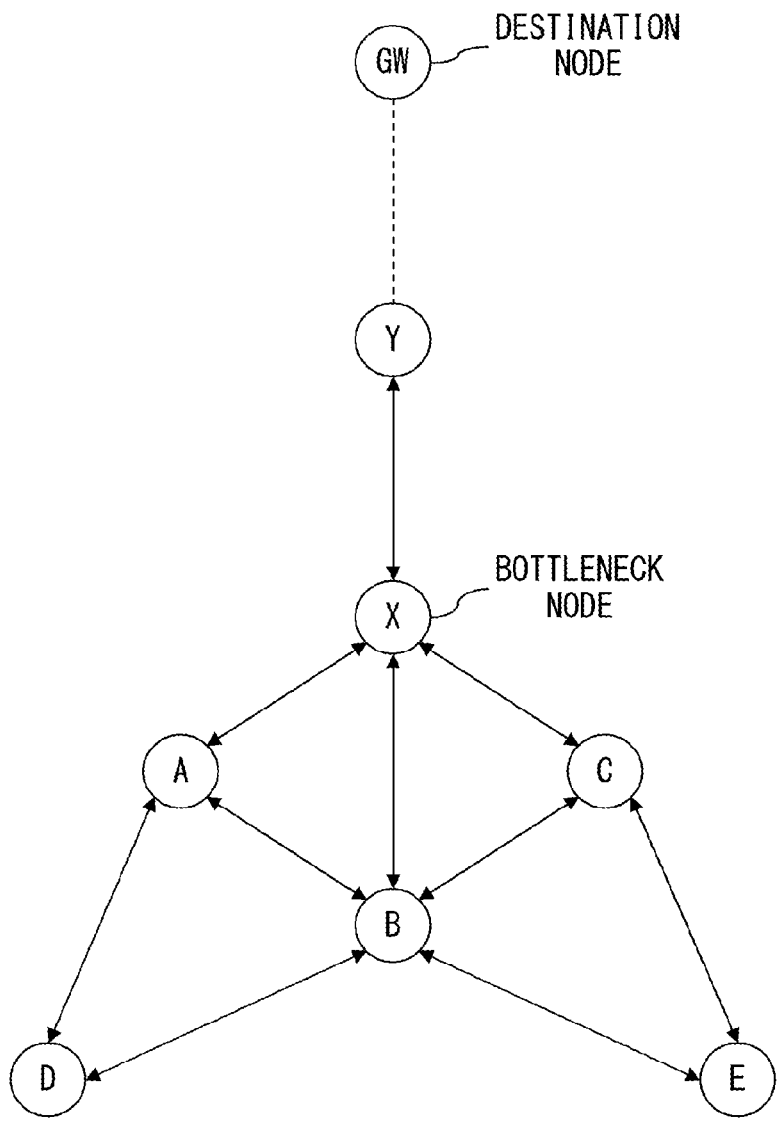
FIG. 1 illustrates a bottleneck node.
Figure 4:
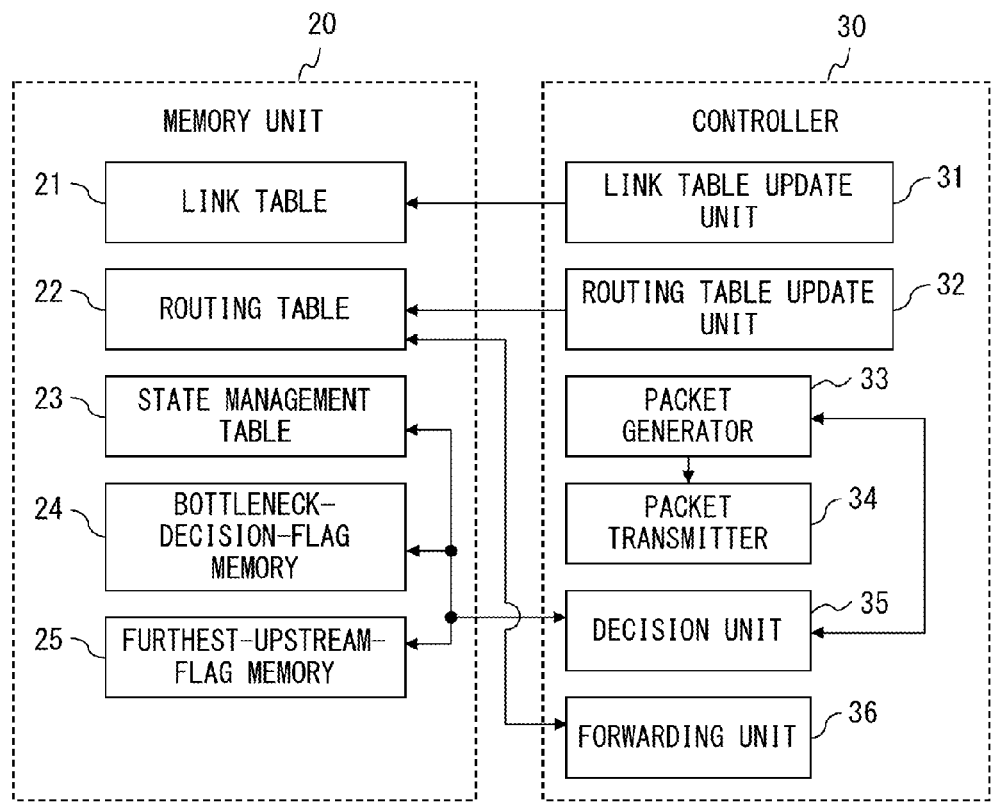
FIG. 4 is a block diagram illustrating functions of a node device.

FIG. 4 is a block diagram illustrating functions of a node device. Note that functions not directly related to searching for a bypass route in a wireless network are not depicted in FIG. 4.

The memory unit 20 stores data processed by the controller 30. The memory unit 20 also stores a link table 21, a routing table 22, a state management table 23, a bottleneck-decision-flag memory 24, and a furthest-upstream-flag memory 25.

The link table 21 stores link information. The link information indicates a quality of a link between a node and its adjacent node. The link table 21 is updated by a link table update unit 31 when a node device receives a Hello packet.

The routing table 22 stores route information. The route information indicates a route through which a packet is transmitted to a destination node. In other words, the route information indicates a correspondence between a destination node of a packet and an adjacent node that relays the packet. When a node device receives a Hello packet, the routing table 22 is updated by a routing table update unit 32.

The state management table 23 manages a state of a node device related to searching for a bypass route. Each node device may hold one of the states of "initial state", "searching process", "bypass-route not present", and "bypass-route present". The bottleneck-decision-flag memory 24 stores a bottleneck decision flag. The bottleneck decision flag indicates which of "non-bottleneck node", "singly isolated", "bottleneck candidate", and "bottleneck node" a node device corresponds to. The furthest-upstream-flag memory 25 stores a furthest-upstream flag. The furthest-upstream flag indicates whether or not a node device is located furthest upstream with respect to a designated destination node.

The controller 30 includes a link table update unit 31, a routing table update unit 32, a packet generator 33, a packet transmitter 34, a decision unit 35, and a forwarding unit 36. In this example, the controller 30 implements the link table update unit 31, the routing table update unit 32, the packet generator 33, the packet transmitter 34, the decision unit 35, and the forwarding unit 36 by executing a program with a processor. The program may be stored in a nonvolatile memory area in the memory unit 20 in advance. Meanwhile, the program may be provided from a removable recording medium to the node device 1. The removable recording medium is, for example, a CD-ROM, a DVD, or a semiconductor memory such as a USB memory. In addition, the node device 1 may receive the program from a program server.

The link table update unit 31 updates link information stored in the link table 21. In particular, the link table update unit 31 updates the link information stored in the link table 21 according to a content of a Hello packet received from the forwarding unit 36.

The routing table update unit 32 updates route information stored in the routing table 22. In particular, the routing table update unit 32 updates the route information stored in the routing table 22 according to a content of a Hello packet received from the forwarding unit 36.

The packet generator 33 generates a Hello packet. The packet generator 33 may generate a Hello packet that includes information related to searching for a bypass route generated by the decision unit 35. The packet transmitter 34 transmits to an adjacent node the Hello packet generated by the packet generator 33.

According to a content of a Hello packet received from the forwarding unit 36, the decision unit 35 decides whether or not there is a bypass route to transmit data to a destination node. The decision unit 35 decides whether or not there is a bypass route by referencing the state management table 23, the bottleneck-decision-flag memory 24, and the furthest-upstream-flag memory 25.

The forwarding unit 36 receives a packet from an adjacent node. Upon receipt of a Hello packet from an adjacent node, the forwarding unit 36 provides this Hello packet to the link table update unit 31, the routing table update unit 32, and the decision unit 35. Meanwhile, upon receipt of a data packet (a packet other than the Hello packet), the forwarding unit 36 references the routing table 22 and specifies an adjacent node corresponding to a destination of the data packet. Then, the forwarding unit 36 transmits the received data packet to the specified adjacent node.

The state management table 23 is an example of a memory unit that stores identification information for identifying a particular adjacent device. The packet generator 33 is an example of a generator that generates search data. The packet transmitter 34 is an example of a transmitter that broadcasts search data to an adjacent device.

Figure 5:
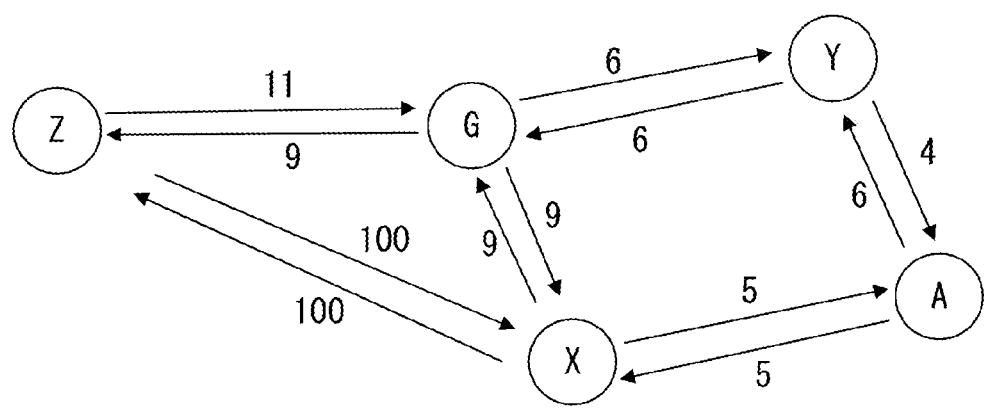
FIG. 5 illustrates evaluation values of links.

FIG. 5 illustrates evaluation values of links. Only some nodes (G, X, Y, Z, and A) of many nodes in a wireless network are depicted in FIG. 5.

The nodes G and X are adjacent to the node Z. The nodes X, Y, and Z are adjacent to the node G. The nodes G, Z, and A are adjacent to the node X. The nodes G and A are adjacent to the node Y. The nodes X and Y are adjacent to the node A. "adjacent" means that radio waves are exchanged between nodes.

A link weight is an indicator of a quality or a communication cost of a wireless link between nodes. In the embodiment, the link weight of a high-quality link is small, and the link weight of a low-quality link is large. The link weight of a link between nodes is calculated according to one set of link evaluation values. As an example, the evaluation value of a link from the node G to the node Z is "9", and the evaluation value of a link from the node Z to the node G is "11". The link weight of a link between nodes is expressed by an average of one set of link evaluation values. Thus, the link weight of the links between the nodes G and Z is "10". Similarly, the link weight of the links between the nodes X and Z is "100". That is, this case indicates that the quality of the links between the nodes G and Z is higher than that of the links between the nodes X and Z.

The quality (i.e., an evaluation value and a link weight) of each link is detected using, for example, the following method. Assume that each node device repeatedly transmits Hello packets in a cycle specified in advance. For a high-quality link, a node device receives Hello packets from an adjacent node at almost regular time intervals. Meanwhile, for a low-quality link, a node device receives Hello packets from an adjacent node at greatly varying time intervals. Accordingly, each node device may detect the quality of a link according to intervals at which Hello packets are received. As an example, the node G illustrated in FIG. 5 may detect the quality of the link from the node Z to the node G by monitoring time intervals at which Hello packets are received from the node Z.

The node device may detect the quality of a link using another method. As an example, the node device may detect the quality of a link according to a received level (e.g., the strength of a received radio wave) of a Hello packet transmitted from an adjacent node.

FIG. 6 illustrates an example of a link table 21. FIG. 6 depicts the link table 21 provided in the node G in FIG. 5.

Link information related to links to and from an adjacent node is stored in the link table 21. Link information includes "adjacent node", "outgoing-link evaluation value", "incoming-link evaluation value", and "link weight". "adjacent node" identifies a node to which a link is connected. "outgoing-link evaluation value" indicates a quality of an outgoing link of the adjacent node. "incoming-link evaluation value" indicates a quality of an incoming link of the adjacent node. "link weight" indicates an average of "outgoing-link evaluation value" and "incoming-link evaluation value".

As an example, the link information stored in a first record illustrated in FIG. 6 indicates the following.
Adjacent node: Z
Outgoing-link evaluation value (a quality of a link from the node Z to the node G): 11
Incoming-link evaluation value (a quality of a link from the node G to the node Z): 9
Link weight (a quality of links between the nodes G and Z): 10

FIG. 7 illustrates an example of a routing table 22. FIG. 7 depicts the routing table 22 provided in the node A in FIG. 5.

For each destination node, route information is stored in the routing table 22. In particular, "global destination (GD)", "local destination (LD)", "route weight", "link weight", and "evaluation value" are stored in the routing table 22. "global destination" identifies a destination node of a packet. "global destination" may be referred to as "final destination device". "local destination" indicates an adjacent node located on a route through which a packet is transmitted to a destination node.

"route weight" indicates a communication cost of a route from "local destination" to "global destination". In particular, "route weight" indicates a sum of link weights of links on a route from "local destination" to "global destination". "link weight" indicates a link weight of a link to "local destination". "evaluation value" corresponds to a total communication cost related to a route to a global destination and is calculated by, for example, the sum of "route weight" and "link weight".

Route information related to the global destination node Z is stored in first and second records of the routing table 22 illustrated in FIG. 7. The first record indicates route information of a route from the node A via the node Y to the node Z. That is, "link weight" of the first record indicates "link weight" of the links between the nodes A and Y. "route weight" of the first record indicates the sum of the link weight of the links between the nodes Y and G and the link weight of the links between the nodes G and Z. "evaluation value" of the first record indicates the quality (the communication cost) of a route from the node A via the nodes Y and G to the node Z. Meanwhile, the second record indicates route information of a route from the node A via the node X to the node Z. That is, "link weight" of the second record indicates "link weight" of the links between the nodes A and X. "route weight" of the second record indicates the sum of the link weight of the links between the nodes X and G and the link weight of the links between the nodes G and Z. "evaluation value" of the second record indicates the quality of a route from the node A via the nodes X and G to the node Z.

As described above, in the examples illustrated in FIG. 5 and FIG. 7, the node device A has a route via the local destination node Y (hereinafter referred to as a "route Y") and a route via the local destination node X (hereinafter referred to as a "route X") as routes through which a data packet is transmitted to the node Z. In the transmitting or forwarding of a data packet to the node Z from the node device A, the forwarding unit 36 of the node device A selects a route with the lowest evaluation value from routes whose global destination is the node Z. In the example illustrated in FIG. 7, the evaluation value of the route Y is 21, and the evaluation value of the route X is 24. Accordingly, in this case, the forwarding unit 36 selects the route Y. That is, the forwarding unit 36 selects the node Y as an optimum local destination.

Similarly, each node device searches the routing table 22 according to a "global destination" of a received packet and selects an optimum local destination node for the received packet. Accordingly, in the ad-hoc network in accordance with the embodiment, data packets are forwarded to a global destination via an optimum route.

FIG. 8 illustrates a format of a Hello packet. A Hello packet 51 includes an ad-hoc header, a global destination (GD), a local destination (LD), an outgoing-link evaluation value, an evaluation value, a search target node, and a node state. The ad-hoc header stores information necessary to transmit a packet in the ad-hoc network. The ad-hoc header may include information that identifies a source node of a Hello packet. In this example, the global destination, the local destination, and the evaluation value are extracted from corresponding entries of the routing table illustrated in FIG. 7. When a plurality of routes (i.e., a plurality of local destinations) are registered in the routing table 22 for one global destination, route information of an optimum route (i.e., a route with the smallest evaluation value) is stored in the Hello packet. The outgoing-link evaluation value indicates the quality of an outgoing link for the adjacent node. The search target node identifies a node for which a decision is made of whether the node is a bottleneck node. The node state indicates one of "initial state", "searching process", "bypass-route not present", and "bypass-route present".

Each node device periodically broadcasts a Hello packet to an adjacent node. That is, each node device exchanges information stored in the routing table 22 with an adjacent node using the Hello packet. According to a content of the Hello packet received from the adjacent node, each node device creates and updates the link table 21 and the routing table 22. By utilizing the Hello packet, each node device reports the search target node and the node state to an adjacent node.

FIG. 9 is a flowchart illustrating an outline of a method for searching for a bypass route in accordance with an embodiment. The procedure of the flowchart illustrated in FIG. 9 is performed by each wireless communication device within the ad-hoc network.

In step S1, a wireless communication device determines whether or not a current time is a bottleneck-decision time. The bottleneck-decision time is designated and set for the wireless communication device by, for example, an operator who manages or administrates the network. When the current time is the bottleneck-decision time, the wireless communication device performs in step S2 a bottleneck candidate decision process. That is, the wireless communication device decides whether or not the wireless communication device itself is a bottleneck candidate. A node device that could possibly be a bottleneck node in an ad-hoc network will be referred to herein as a "bottleneck candidate".

In step S3, the wireless communication device performs a bypass route searching process. In the bypass route searching process, it is determined whether or not a bottleneck candidate is a bottleneck node. In the procedure illustrated in FIG. 9, the bypass route searching process is continuously or repeatedly performed by each wireless communication device.

As described above, in the bypass route searching method in accordance with the embodiment, a bottleneck candidate is extracted from many wireless communication devices. Then the bypass route searching process is performed for the extracted bottleneck candidate. Thus, according to the bypass route searching method, a bottleneck node can be efficiently found in an ad-hoc network.

<Bottleneck Candidate Decision Process>

Each node device determines whether or not the node device itself is a bottleneck candidate. The node device determines a bottleneck candidate using the following first to third methods.

Figure 10:
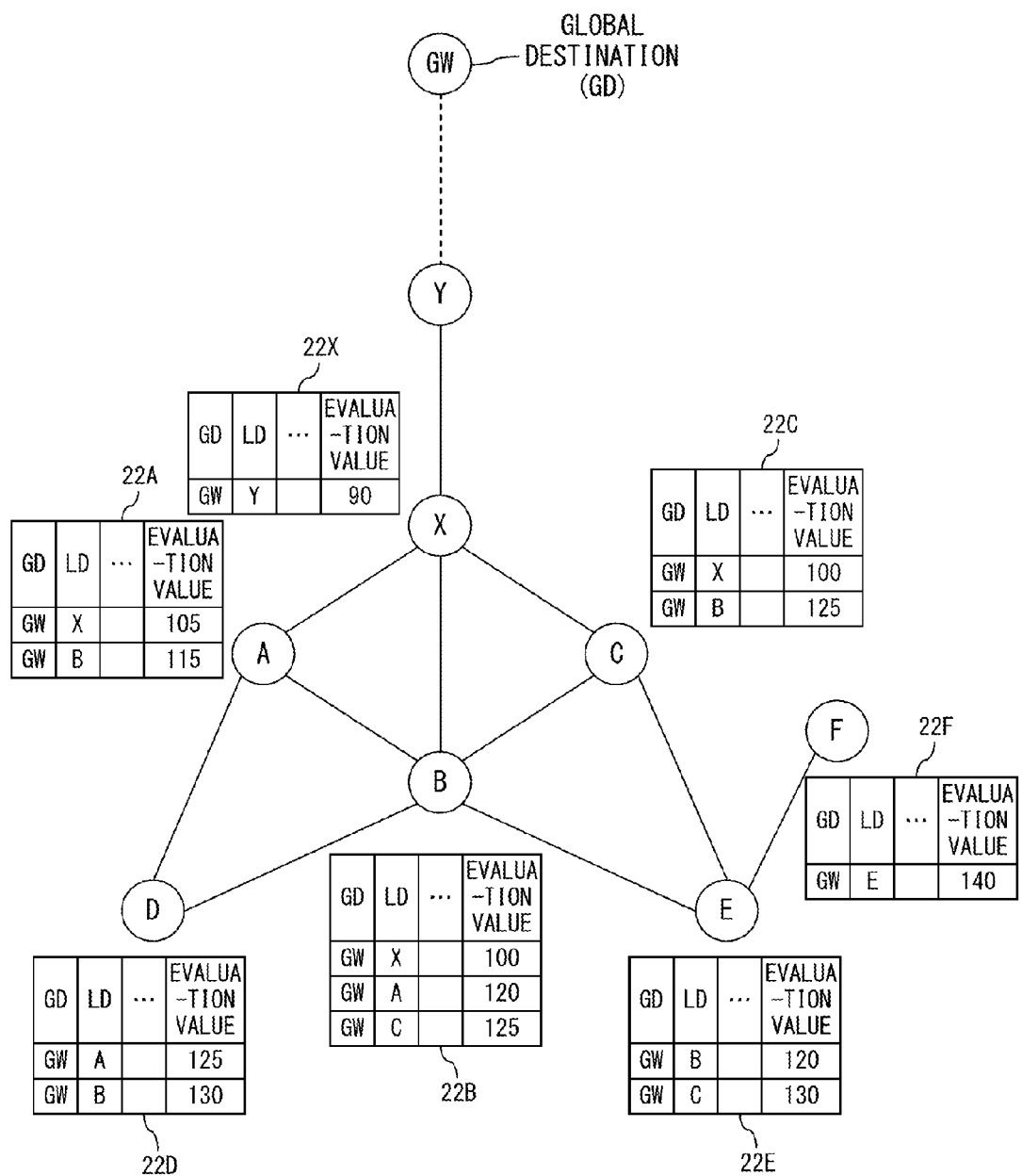
FIG. 10 illustrates first and second methods for performing a bottleneck candidate decision process.

FIG. 10 illustrates first and second methods for performing a bottleneck candidate decision process. An ad-hoc network illustrated in FIG. 10 includes nodes A to F and nodes X, Y, and GW. In FIG. 10, solid lines connecting nodes to each other indicate wireless links. That is, the node X is adjacent to the node Y. The nodes A, B, C and Y are adjacent to the node X. The nodes B, D and X are adjacent to the node A. The nodes A, C, D, E and X are adjacent to the node B. The nodes B, E and X are adjacent to the node C. The nodes A and B are adjacent to the node D. The nodes B, C and F are adjacent to the node E. The node E is adjacent to the node F. The node Y may be adjacent to the node GW or may not be adjacent to the node GW. However, one or more communication routes are present between the nodes Y and GW.

In an ad-hoc network with the aforementioned configuration, each node device periodically broadcasts a Hello packet to an adjacent node. Accordingly, each node device receives a Hello packet from one or more adjacent nodes. According to a content of a Hello packet received from an adjacent node, each node device creates and updates a routing table 22. As a result, the node devices A to F and the node device X respectively include routing tables 22A to 22F and a routing table 22X.

The following descriptions will be given under a condition in which the node devices A to F and the node device X each transmit data to the node GW. That is, a global destination of the nodes A to F and the node X is the node GW. The node device GW is, for example, a gateway device that collects data from the nodes A to F and the node X. The gateway device is connected to, for example, a server computer outside the ad-hoc network and transmits data collected from the nodes A to F and the node X to this server computer. The gateway device does not transmit a Hello packet used within the ad-hoc network to outside the ad-hoc network.

In the first method, each node device determines that the node device itself is a bottleneck candidate when the following condition A is satisfied.

Condition A: there is only one local destination for a global destination.

As an example, two routes (a route whose local destination is the node X, and a route whose local destination is the node B) for the "global destination GD: node GW" are registered in the routing table 22A of the node device A. In this case, when the link between the nodes A and X is disconnected, the node device A can transmit data to the node GW via the node B. Thus, in this case, the node device A determines that the node device itself (i.e., the node A) is not a bottleneck candidate.

By contrast, only one route (a route whose local destination is the node Y) for "global destination GD: node GW" is registered in the routing table 22X of the node device X. In this case, when the link between the nodes X and Y is disconnected, the node device X may be incapable of transmitting data to the node GW. Thus, in this case, the node device X determines that the node device itself (i.e., the node X) is a bottleneck candidate. Similarly, the node device F also determines that the node device itself (i.e., the node F) is a bottleneck candidate.

In the second method, each node device determines that the node device itself is a bottleneck candidate when the following conditions A and B are satisfied.

Condition A: there is only one local destination for a global destination.

Condition B: there are a plurality of adjacent nodes.

In the example illustrated in FIG. 10, the node devices X and F satisfy the condition A. Accordingly, the condition B will be considered for the node devices X and F.

The node device F has only one adjacent node. Thus, when the node device F fails, no node (other than the node device F) is made to be incapable of transmitting data to the node GW due to the failure. That is, even in the case of a node that satisfies the condition A, as long as the condition B is unsatisfied, there is not a great need to examine whether or not this node is a bottleneck node. Accordingly, in the second method, the node device F determines that the node device itself (i.e., the node F) is not a bottleneck node. However, the node device F determines that the node device itself (i.e., the node F) is "singly isolated".

The node device X has four adjacent nodes (Y, A, B, and C) and satisfies the condition B. For the node device X, the node Y is a local destination LD in data transmission to the node GW. Accordingly, upon receipt of data addressed to the node GW from the adjacent node A, B, or C, the node device X forwards the received data to the node Y. In this case, when the node device X fails, many nodes, including the nodes A to C, have a risk of being incapable of transmitting data to the node GW. Accordingly, for a node that satisfies the conditions A and B, it is preferably examined whether or not this node is a bottleneck node. That is, in the second method, the node device X determines that the node device itself (i.e., the node X) is a bottleneck candidate.

In the third method, each node device determines that the node device itself is a bottleneck candidate when the following conditions A and C are satisfied.

Condition A: there is only one local destination for a global destination.

Condition C: the node device is selected as a local destination for a global destination by all of the adjacent nodes except for a node selected as a local destination for the global destination.

In the following, descriptions will be given of a case in which the node device X performs the bottleneck candidate decision process in the ad-hoc network illustrated in FIG. 11. Note that nodes A-E, X, Y, G, and W illustrated in FIG. 11 are substantially the same as the corresponding nodes that are described with reference to FIG. 10.

Figure 11:
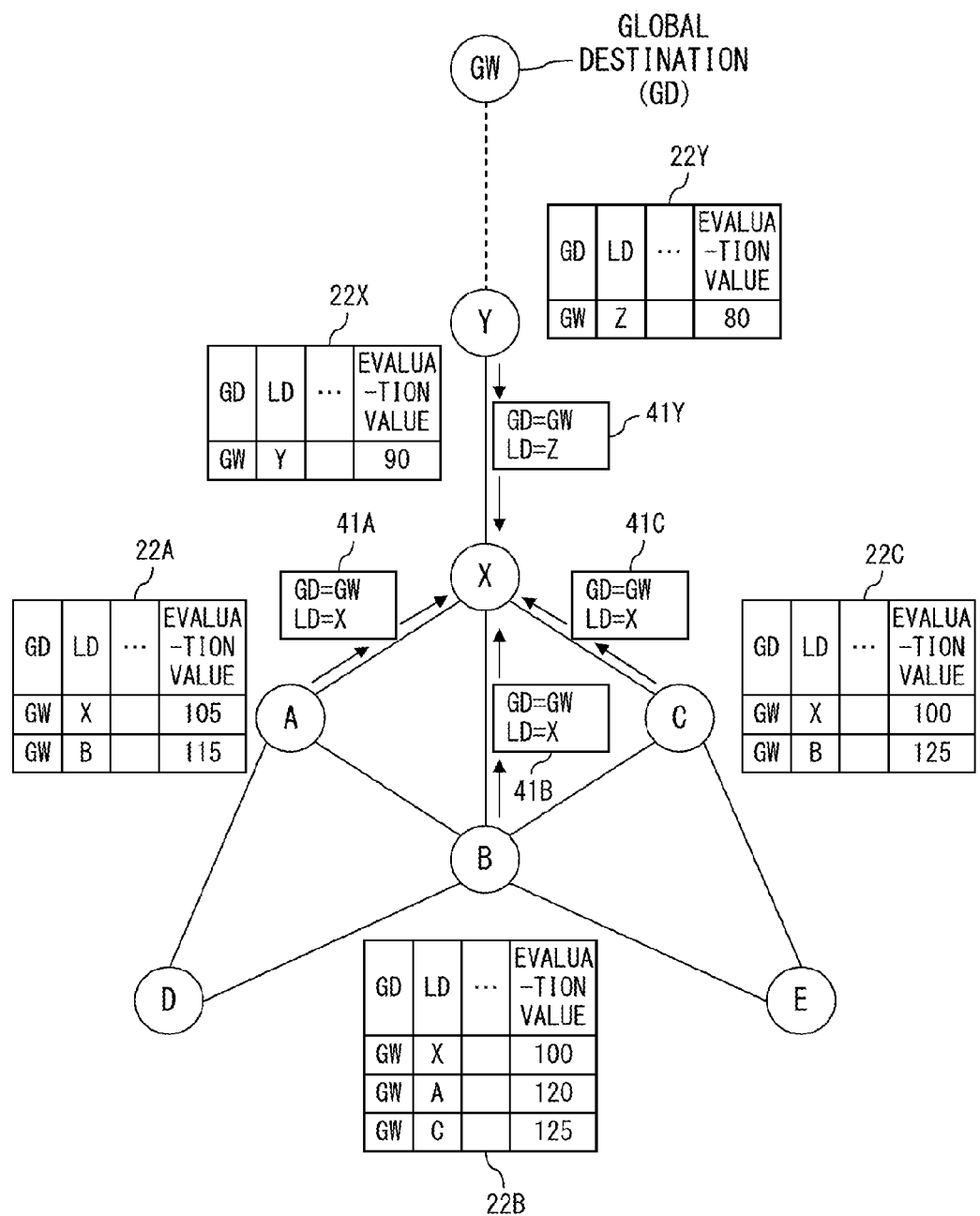
FIG. 11 illustrates a third method for performing a bottleneck candidate decision process.

As illustrated in FIG. 11, the node device X has four adjacent nodes (A, B, C, and Y). "Local destination LD: node Y" for "global destination GD: node GW" is registered in the routing table 22X. That is, when the node device X generates or receives data whose global destination is the node GW, the node device X transmits this data to the adjacent node Y.

In accordance with Hello packets received from the nodes A, B, C and Y, the node device X determines whether or not the node device itself (i.e., the node X) is a bottleneck candidate. In this case, the node devices A, B, C and Y each broadcast a Hello packet including route information.

As an example, the node device A includes a routing table 22A. Two routes (a route whose local destination is the node X, and a route whose local destination is the node B) for "global destination GD: node GW" are registered in the routing table 22A. Comparing these two routes with each other indicates that the evaluation value of the route whose local destination is the node X is smaller. In this case, the node device A selects the route whose local destination is the node X as an optimum route to the node GW. That is, the route information of the routing table 22A indicates "when the node device A generates or receives data whose global destination is the node GW, the node device A transmits this data to the adjacent node X". Then, using a Hello packet, the node device A reports to an adjacent node the route information for transmitting data to the node GW. In FIG. 11, the node device A broadcasts a Hello packet 41A that includes "GD=GW, LD=X" to adjacent nodes. "GD=GW, LD=X" indicates that "node GW" and "node X" are respectively set as "global destination" and "local destination" of the Hello packet illustrated in FIG. 8. The Hello packet 41A transmitted from the node device A reaches the adjacent node X (and the nodes B and D).

Similarly, the node devices B, C and Y broadcast Hello packets 41B, 41C and 41Y, respectively. The Hello packets 41B, 41C and 41Y include the following route information.

41B: "GD=GW, LD=X"
41C: "GD=GW, LD=X"
41Y: "GD=GW, LD=Z"

Note that the node Z is not illustrated in FIG. 11.

According to the Hello packets 41A, 41B, 41C and 41Y and a content of the routing table 22X, the node device X determines whether or not the node device itself (i.e., the node X) is a bottleneck candidate for data transmission to the node GW. Only one "local destination LD" is registered for "global destination GD: node GW" in the routing table 22X (i.e., LD=Y). Thus, the node device X satisfies the condition A. From among the adjacent nodes A, B, C and Y of the node X, all of the nodes except for the local-destination node Y, i.e., all of the three adjacent nodes A, B and C, select "node X" as a local destination LD for "global destination GD: node GW". That is, the node device X also satisfies the condition C. Accordingly, the node device X determines that the node device itself (i.e., the node X) is a bottleneck candidate for data transmission to the node GW.

In FIG. 11, as described above, when the node devices A to C each select the node X as a local destination in data transmission to the node GW, the node device X satisfies the condition C. Accordingly, when the node device X satisfies the condition C, it is highly likely that a failure of the node X will disable many nodes, including the nodes A to C, from transmitting data to the node GW. Accordingly, for a node that satisfies the conditions A and C, it is preferably examined whether or not this node is a bottleneck node.

<Bypass Route Searching Process>

As described above, in the bypass route searching method in accordance with the embodiment, a bottleneck candidate is extracted in an ad-hoc network. Then, the bypass route searching process is performed for the extracted bottleneck candidate. The bypass route searching process is performed using the state management table 23 provided for each node device.

FIG. 12 illustrates an example of a state management table 23. Note that FIG. 12 depicts the state management table 23 created at the node device X in FIG. 10 or FIG. 11.

The state management table 23 manages "local destination", "search target node", "adjacent node", and "state" for each global destination. In this example, for "global destination GD: node GW", "local destination", "search target node", "adjacent node", and "state" are registered.

An adjacent node selected as an optimum route to a global destination is registered in "local destination". A local destination corresponding to the global destination is detected from the routing table 22. A node for which a decision is made whether or not this node is a bottleneck node (i.e., a bottleneck candidate) is registered in "search target node". An adjacent node whose state is managed is registered in "adjacent node". However, each node device also manages its own state. Thus, the nodes registered as "adjacent node" in the state management table 23 not only include adjacent nodes but also the node itself. Note that nodes registered as "adjacent node" do not necessarily include a local destination node for a global destination. Only a node and an adjacent node that selects this node as a local destination may be registered in "adjacent node". "state" indicates one of "0: initial state", "1: searching process", "2: bypass-route not present", and "3: bypass-route present".

FIG. 13 illustrates state transitions of a node device. Each node device operates in one of the four states illustrated in FIG. 13. "initial state" indicates that a node device is not involved in a bypass route search. "searching process" indicates that a node device is performing a bypass route search. "bypass-route not present" indicates that a route not connected via a bottleneck candidate in data transmission from a node device to a global destination (i.e., a bypass route) has not been found. "bypass-route present" indicates that a route not connected via a bottleneck candidate in data transmission from a node device to a global destination (i.e., a bypass route) has been found.

In the following, an example of the bypass route searching process will be described. The following descriptions will be given under a condition in which a node GW is a global destination in an ad-hoc network illustrated in FIG. 14. Assume that a node X is a bottleneck candidate; in addition, node devices A to E and a node X respectively have routing tables 22A to 22E and a routing table 22X.

In data transmission to the global destination, each node device selects as a local destination an adjacent node with the smallest link evaluation value. In FIG. 14, the selection of the an adjacent node with the smallest link evaluation value (that is, the selection of a local destination node) is represented by a arrow mark. As an example, in data transmission to the node GW, the node devices A, B and C select the "node X" as a local destination. That is, the node X is selected as a local destination by the node devices A, B and C. Meanwhile, in data transmission to the node GW, the node device D selects the "node A" as a local destination. That is, the node A is selected as a local destination by the node device D. Moreover, in data transmission to the node GW, the node device E selects the "node B" as a local destination. That is, the node B is selected as a local destination by the node device E.

The nodes D, C and E are not selected as a local destination by another node, i.e., by an adjacent node. Accordingly, in data transmission to the node GW, the node devices D, C and E do not "relay" data transmitted from another node. That is, a node that is not selected as a local destination by an adjacent node is located "furthest upstream" in data transmission to a global destination. Thus, a node that is not selected as a local destination by an adjacent node may hereinafter be referred to as a "furthest-upstream node". In the example illustrated in FIG. 14, the nodes D, C and E are the furthest-upstream nodes in data transmission to the node GW.

Figure 15:
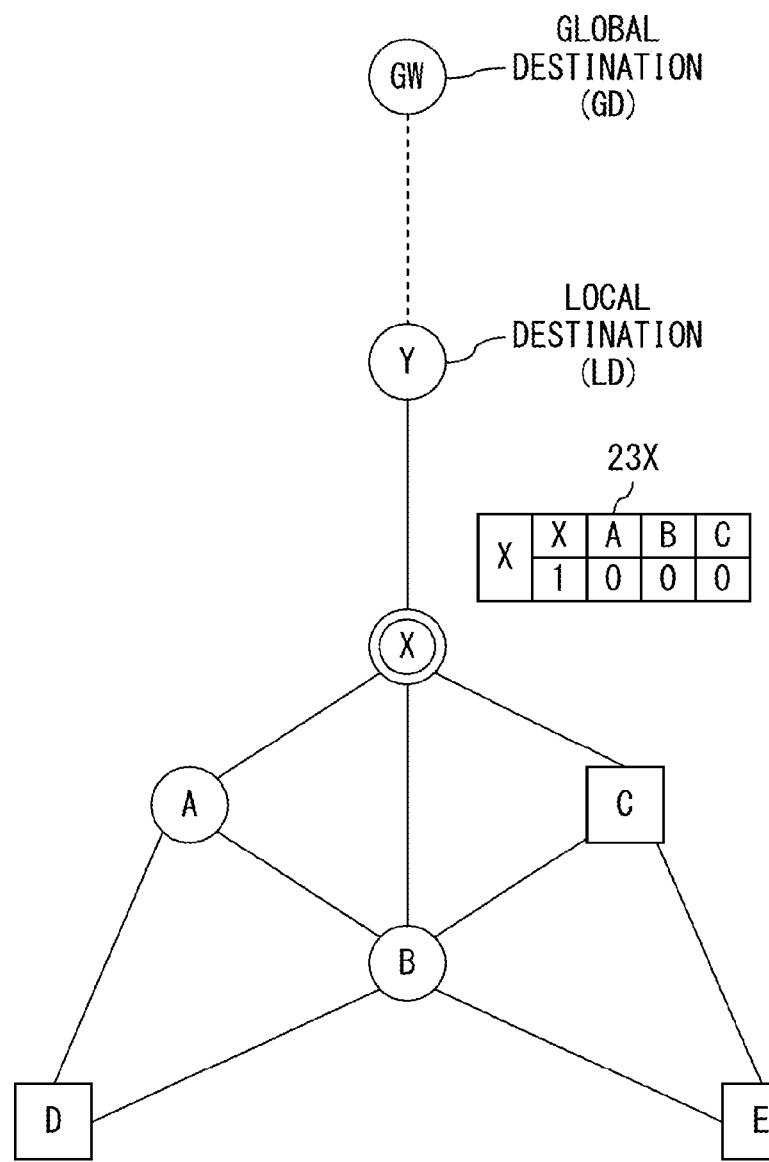
FIG. 15 illustrates a state indicated when a bypass route searching process is started.

FIG. 15 illustrates a state indicated when a bypass route searching process is started. In FIG. 15, a search target node (i.e., a node X) is the aforementioned bottleneck candidate and is represented by a double circle. Furthest-upstream nodes (i.e., nodes D, C and E) are represented by squares.

The node device X includes a state management table 23X. "X" to the leftmost of the state management table 23X illustrated in FIG. 15 identifies a search target node. The state management table 23X manages states of the nodes X, A, B and C. That is, the node device X manages its own state and states of adjacent nodes that select the node X as a local destination (i.e., the nodes A, B and C). The node X is a search target node (i.e., a bottleneck candidate). Accordingly, in the state management table 23X, the state of the node X is set to "1: searching process". In the following, examples of the bypass route searching process will be described with reference to FIGS. 16-23.

Figure 16:
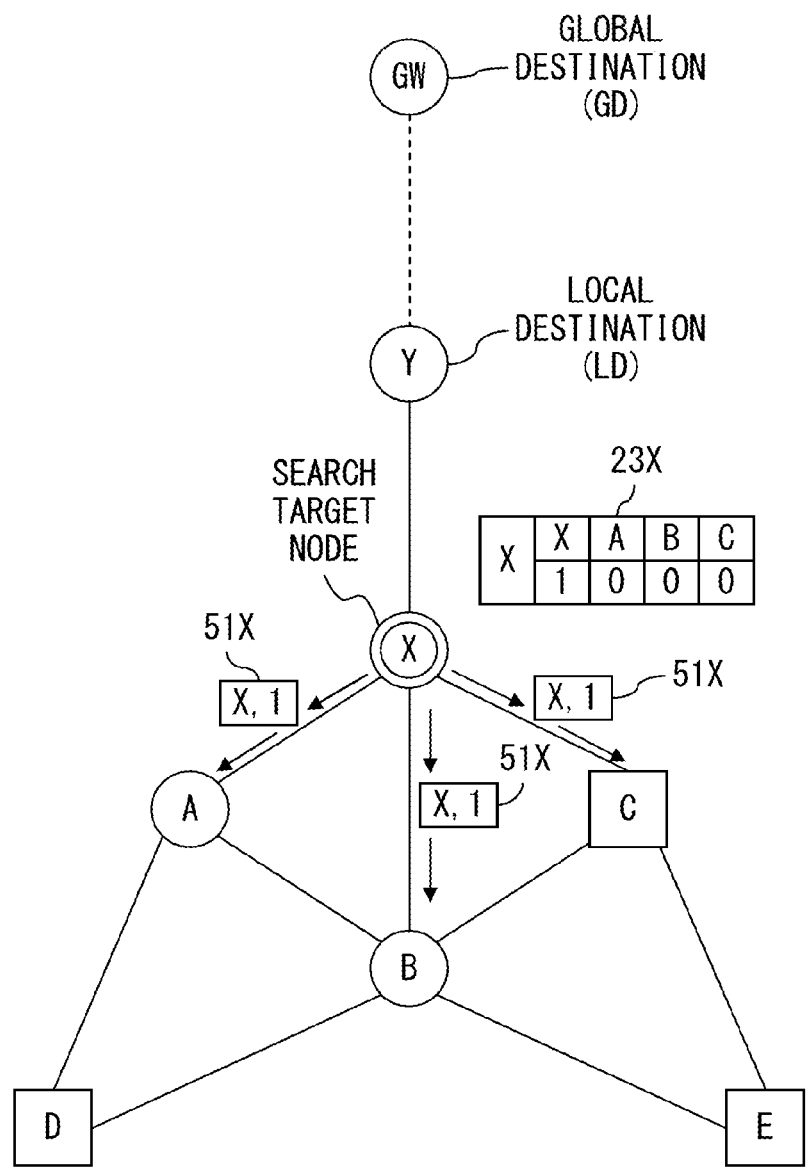
FIGS. 16-21 illustrate examples of a bypass route search in a network having no bypass route.
Figure 17:
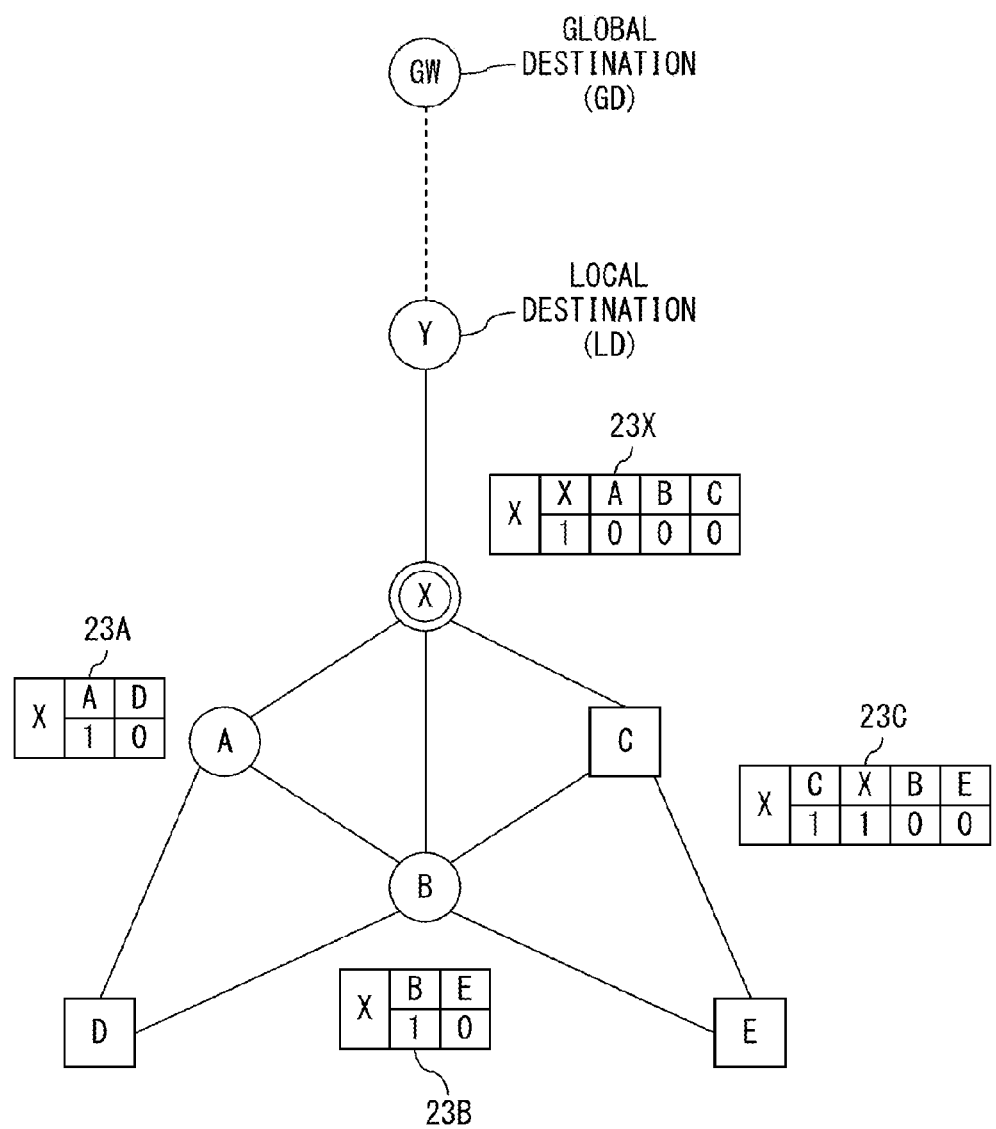

As illustrated in FIG. 16, the node device X transmits a Hello packet including search information to adjacent nodes. As illustrated in FIG. 8, the search information includes information that identifies a search target node and information that indicates a node state. In this example, the search target node is the node X, and the state of the node X is "1: searching process". Accordingly, the node device X transmits a Hello packet 51X that includes search information "X,1". "X,1" indicates "search target node: node X" and "node state: 1". A Hello packet that includes search information "X,1" may hereinafter be referred to as a Hello packet "X,1". The Hello packet "X,1" is an example of search data that includes information indicating a search of a route to a final destination device. The Hello packet "X,1" transmitted from the node X is received by the adjacent nodes A, B, C and Y. Upon receipt of the Hello packet "X,1", the node devices A, B and C create or update state management tables 23A, 23B and 23C, as illustrated in FIG. 17.

The node A is not a furthest-upstream node. Thus, the state management table 23A of the node A manages the states of the node A and the node D, which selects the node A as a local destination. Upon receipt of the Hello packet "X,1", the node device A updates the state management table 23A so as to change the state of the node A from "0: initial state" to "1: searching process". Operations performed by the node device B upon receipt of the Hello packet "X,1" from the node X are substantially the same as those performed by the node A.

As described above, the node C is a furthest-upstream node. Thus, the state management table 23C of the node C manages the states of the node C and the adjacent nodes X, B and E. Upon receipt of the Hello packet "X,1" from the node X, the node device C updates the state of the node C from "0" to "1", and also updates the state of the node X that is a source of the Hello packet "X,1" from "0" to "1".

The node device Y also receives the Hello packet "X,1" from the node X. However, the node Y is selected as a local destination by the node X that is a search target node. In this case, the node device Y ignores the Hello packet "X,1" received from the node X. Accordingly, an operation of the node Y will not be described in the following.

Figure 18:
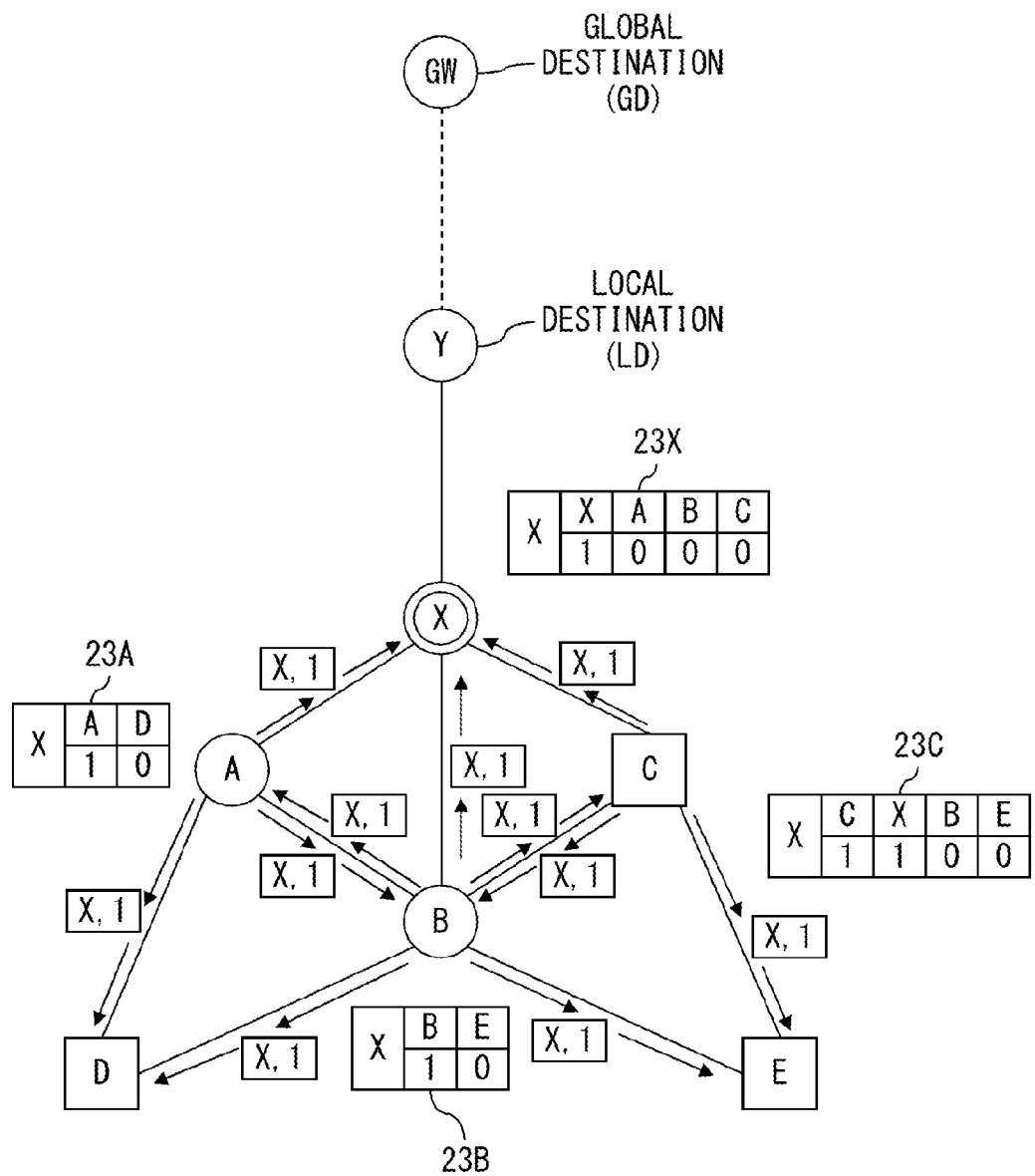

As illustrated in FIG. 18, the node devices A, B and C each transmit a Hello packet including search information to adjacent nodes. The state of the node A has been updated to "1: searching process". The search target node is not changed. Thus, the node device A transmits the Hello packet "X,1" to its adjacent nodes. Similarly, the node devices B and C transmit the Hello packet "X,1" to their adjacent nodes. Node devices are autonomously operated, so the node devices A, B and C transmit the Hello packet "X,1" at independent timings.

Figure 19:
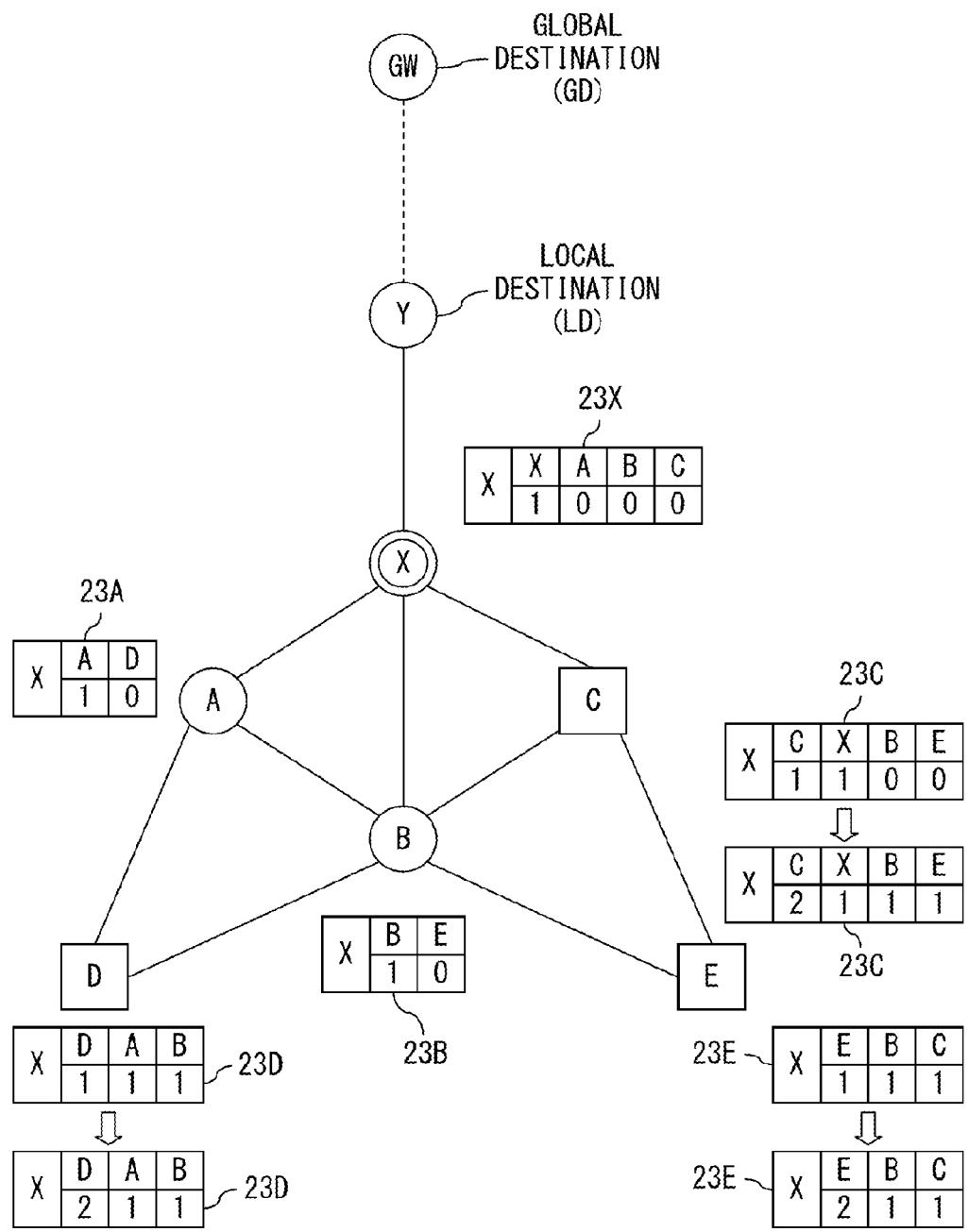

As illustrated in FIG. 18, the node device D receives the Hello packets "X,1" from the nodes A and B. As described above, the node D is a furthest-upstream node. Thus, the state management table 23D of the node D manages the states of the node D and the adjacent nodes A and B, as illustrated in FIG. 19. Upon receipt of the Hello packet "X,1" from the node A, the node device D updates the state of the node device itself (i.e., the node D) from "0" to "1", and the node device D also updates the state of the node A that is a source of the Hello packet "X,1" from "0" to "1". Meanwhile, upon receipt of the Hello packet "X,1" from the node B, the node device D also updates the state of the node B that is a source of the Hello packet "X,1" from "0" to "1". As a result, the states of all of the nodes managed by the state management table 23D of the node D (i.e., the nodes D, A and B) are set to "1".

Similarly, when the node device E receives the Hello packets "X,1" from the nodes B and C, the states of all of the nodes managed by the state management table 23E (i.e., the nodes E, B and C) are set to "1". When the node device C receives the Hello packets "X,1" from the nodes X, B and E, the states of all of the nodes managed by the state management table 23C (i.e., the nodes C, X, B and E) are set to "1". FIG. 19 indicates a situation achieved after the node D receives the Hello packets "X,1" from the nodes A and B, the node E receives the Hello packets "X,1" from the nodes B and C, and the node C receives the Hello packets "X,1" from the nodes X, B and E.

Figure 20:
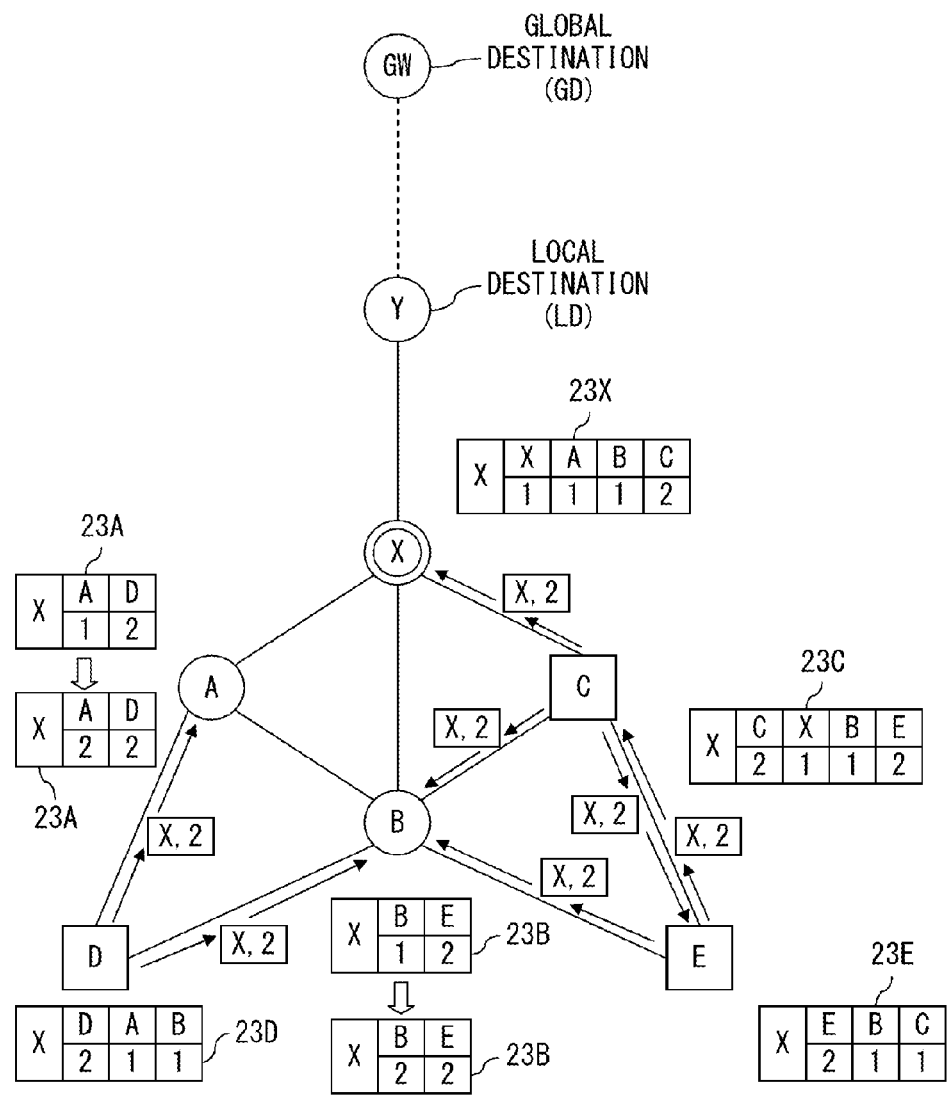

When the states of all of the nodes managed by the state management table 23D become "1", the node device D that is a furthest-upstream node updates the state of the node device itself (i.e., the node D) from "1: searching process" to "2: bypass-route not present", as illustrated in FIG. 19. Then, as illustrated in FIG. 20, the node device D transmits a Hello packet including search information "X,2" to the adjacent nodes. "X,2" indicates "search target node: node X" and "node state: 2". The Hello packet including the search information "X,2" may be referred to as a Hello packet "X,2". Moreover, as with the node device D, the node devices E and C also transmit the Hello packet "X,2" to the adjacent nodes.

Next, a role of the Hello packet "X,2" will be described. The Hello packet "X,2" is generated when the furthest-upstream node receives the Hello packets "X,1" from all of the adjacent nodes. A situation in which the furthest-upstream node receives the Hello packets "X,1" from all of the adjacent nodes means that the Hello packet "X,1" initially generated by the search target node (i.e., the node X) is not forwarded beyond the furthest-upstream node. That is, this situation indicates that the Hello packet "X,1" transmitted from the search target node cannot reach the global destination via the furthest-upstream node. Accordingly, the Hello packet "X,2" substantially indicates that a "bypass route for transmitting data to global destination is not present". That is, the Hello packet "X,2" is an example of data (or response data) that includes information indicating that the Hello packet "X,1" does not reach the final destination device.

The node devices D, E and C, which are located furthest upstream with respect to the node GW, each transmit the Hello packet "X,2" to corresponding adjacent nodes, as illustrated in FIG. 20. Upon receipt of the Hello packet "X,2", each node device updates the state of the source node of the received Hello packet "X,2" in the state management table 23, i.e., updates "1: searching process" to "2: bypass-route not present". As an example, upon receipt of the Hello packet "X,2" from the node D, the node device A updates the state of the node D in the state management table 23A from "1" to "2". Similarly, upon receipt of the Hello packet "X,2" from the node E, the node device B updates the state of the node E in the state management table 23B from "1" to "2".

When a node device (except for a furthest-upstream node) receives the Hello packets "X,2" from all of the adjacent nodes that select this node device as a local destination, this node device updates the state of itself in the state management table 23 to "2". As an example, when the node device A receives the Hello packets "X,2" from all of the adjacent nodes that select the node A as a local destination (in this example, from the node D), the node device A updates the state of the node A in the state management table 23A to "2", as illustrated in FIG. 20. That is, when the states of all of the adjacent nodes managed by the state management table 23A become "2", the node device A also updates the state of the node device itself (i.e., the node A) to "2". Similarly, in FIG. 20, when the node device B receives the Hello packets "X,2" from all of the adjacent nodes that select the node B as a local destination (in this example, from the node E), the node device B updates the state of the node B in the state management table 23B to "2".

Figure 21:
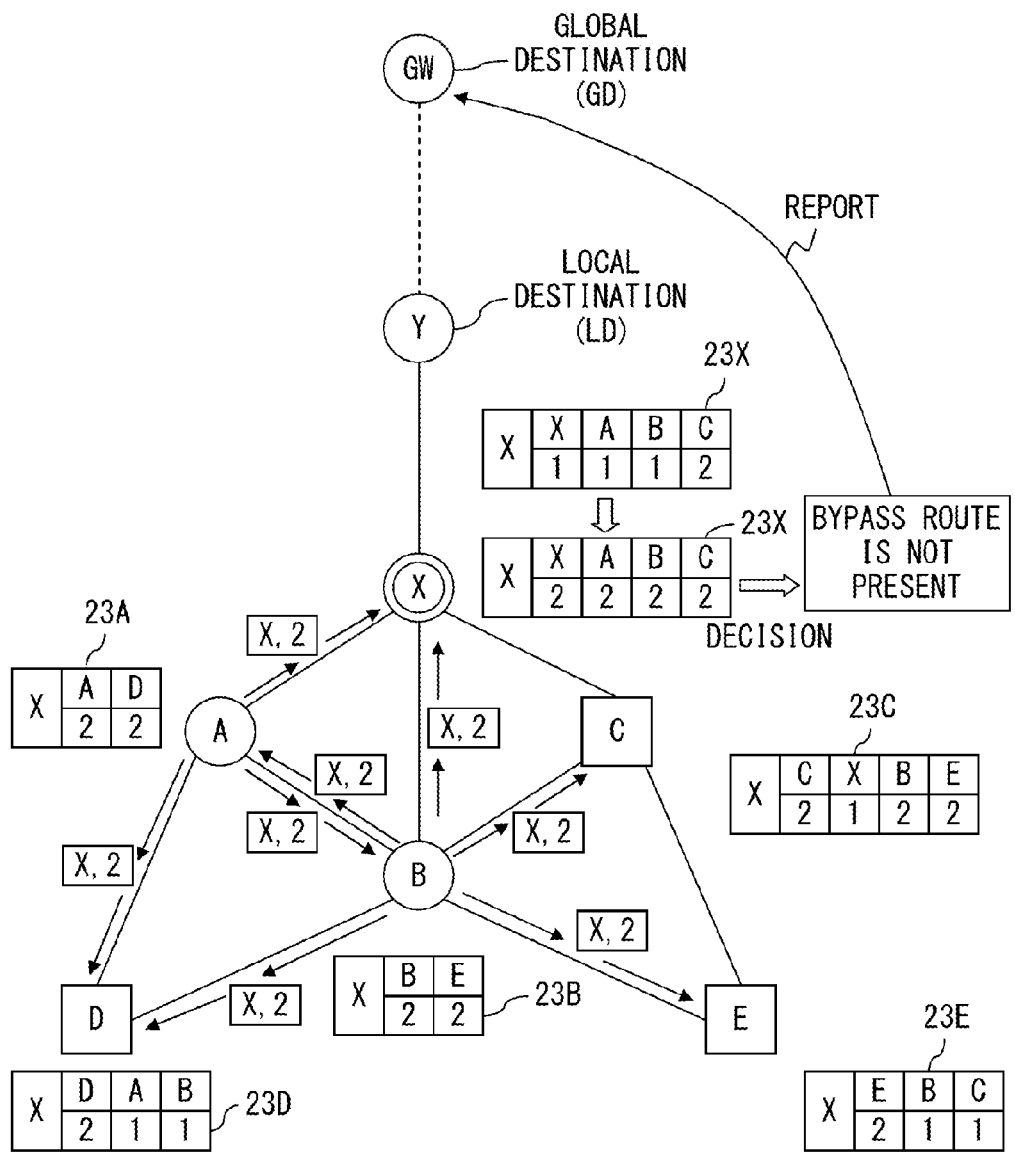

When the state of the node device A becomes "2", the node device A transmits the Hello packet "X,2" to the adjacent nodes, as illustrated in FIG. 21. Similarly, when the state of the node device B becomes "2", the node device B transmits the Hello packet "X,2" to the adjacent nodes.

As illustrated in FIG. 20 and FIG. 21, the node device X receives the Hello packet "X,2" from each of the nodes A, B and C. Accordingly, in the state management table 23X of the node X, the states of the nodes A, B and C are updated to "2", and the state of the node X is also updated to "2".

When the node device X, which is a bottleneck candidate, receives the Hello packets "X,2" from all of the nodes that select the node X as a local destination, the node device X determines that there is no bypass route for data transmission to the global destination GW. That is, upon receipt of the Hello packets "X,2" from the nodes A, B and C, the node device X determines that the route via the node Y is the only route for transmitting data to the node GW, i.e., determines that a bypass route is not present. Accordingly, the node device X reports to the node device GW information indicating that the node X is a bottleneck for data transmission to the node GW and that a bypass route is not present. The reporting method is not particularly limited, so any data format may be used.

After reporting to the node GW that a bypass route is not present, the node device X transmits a Hello packet "X,0" to adjacent nodes. "X,0" indicates "search target node: node X" and "node state: 0 (initial state)". That is, the Hello packet "X,0" instructs each node device to initialize the state management table 23.

The node device that receives the Hello packet "X,0" updates the state corresponding to the search target node X in the state management table 23 to "0" and transmits the Hello packet "X,0" to corresponding adjacent nodes. After a specified search-information-holding time passes after the transmission of the Hello packet "X,0", each node device deletes the information stored in the state management table 23 that corresponds to the search target node X. The search-information-holding time is, for example, a time period from transmission of an initial Hello packet "X,1" to reception of a final Hello packet "X,2". The search-information-holding time may be the time period above with a specified margin added.

Next, a case will be described in which a bypass route is present for transmission to the node GW. In this example, as illustrated in FIG. 22, the node H is adjacent to the node C, and there is a route between the nodes H and GW that does not pass through the node X (hereinafter referred to as a "bypass route H").

In this case, the node device H receives a Hello packet "X,1" from the node C. Then, the node device H updates the state management table 23 and transmits the Hello packet "X,1" to adjacent nodes. The bypass route H is present between the nodes H and GW. Thus, the Hello packet "X,1" transmitted from the node H propagates via the bypass route H and reaches the node GW. During this period, the node devices A to E transmit and receive the Hello packet "X,1" and/or the Hello packet "X,2".

Figure 22:
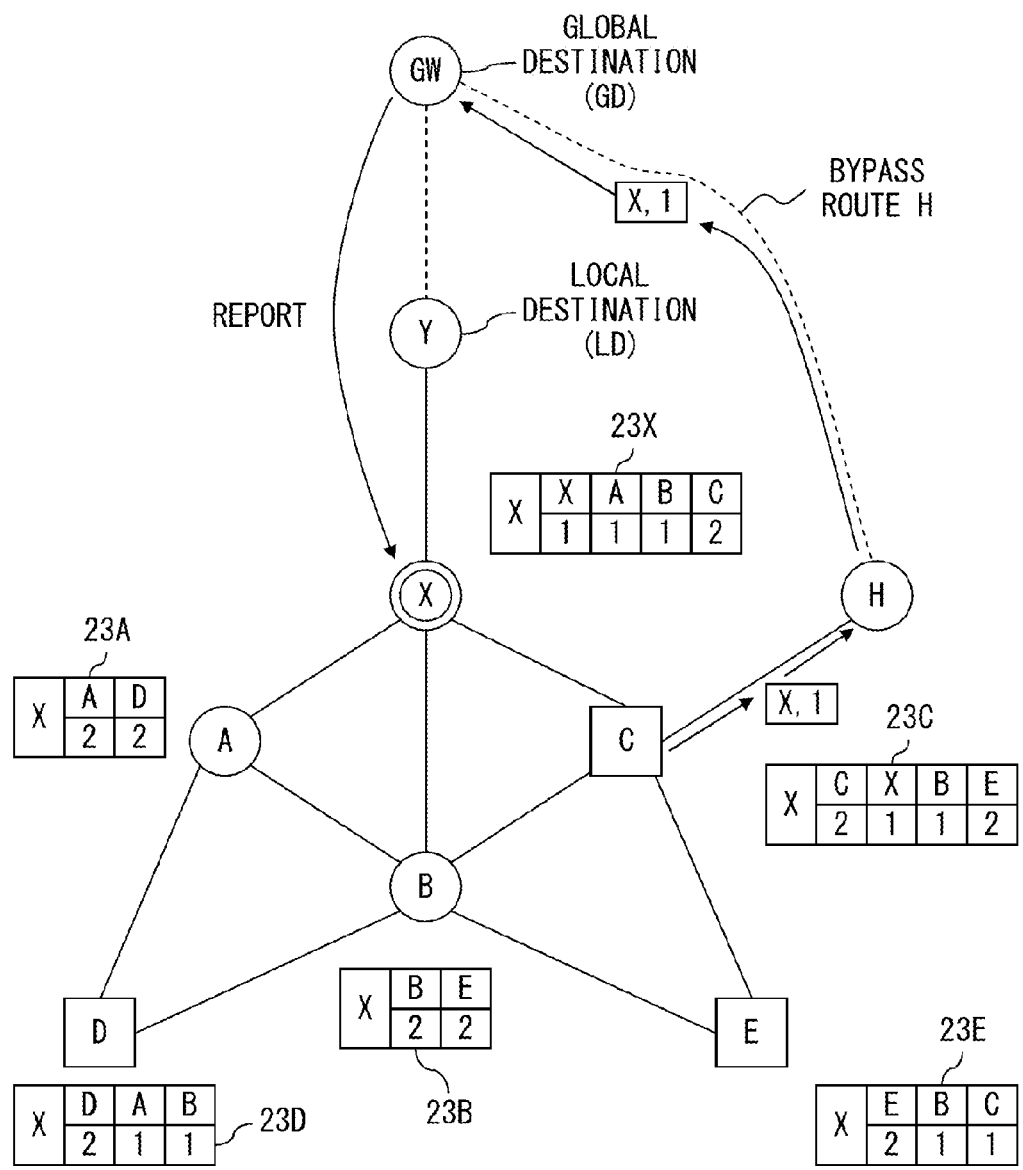
FIG. 22 and FIG. 23 illustrate examples of a bypass route search in a network having a bypass route.

Upon receipt of the Hello packet "X,1" transmitted via the bypass route H, the node device GW reports to the search target node (i.e., the node X) information indicating that the Hello packet "X,1" has been received, as illustrated in FIG. 22. That is, the node device GW reports to the node X information indicating that a bypass route is present. The reporting method is not particularly limited, so any data format may be used.

Figure 23:
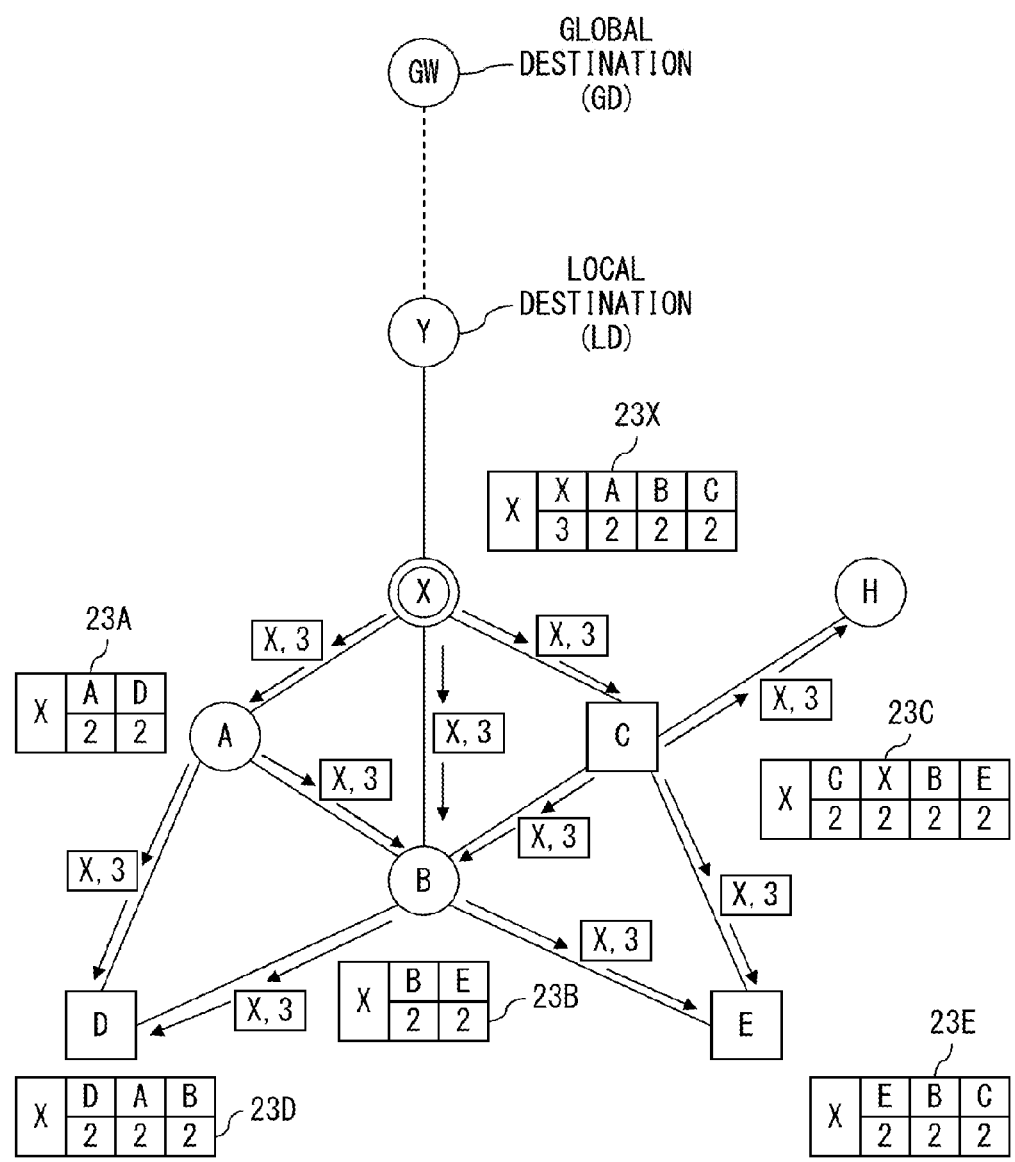

Upon receipt of the information from the node GW indicating that a bypass route is present, the node device X updates the state of the node device itself (i.e., the node X) in the state management table 23X to "3: bypass-route present", as illustrated in FIG. 23. Meanwhile, the node device X transmits the Hello packet "X,3" to adjacent nodes. "X,3" indicates "search target node: node X" and "node state: 3".

The node device that receives the Hello packet "X,3" updates the "state" corresponding to the search target node X in the state management table 23 to "3" and transmits the Hello packet "X,3" to adjacent nodes. Moreover, when the search-information-holding time passes after the transmission of the Hello packet "X,3", each node device deletes the search information stored in the state management table 23 that corresponds to the search target node X.

After the search information is deleted from the state management table 23, each node device may transmit a Hello packet to which search information is not added. In this case, the Hello packet is in the format illustrated in FIG. 8 with "search target node" and "node state" deleted.

In the ad-hoc network in accordance with the embodiment, each node device is autonomously operated. Thus, an order in which a node device receives the Hello packets "X,1", "X,2", "X,3", and "X,0" is not necessarily the same.

For example, assume that it takes a long time before a Hello packet "X,1" transmitted via the bypass route H from the node C reaches the node GW. In this case, before the node GW receives the Hello packet "X,1", the Hello packet "X,2" may propagate to each node. Accordingly, before the node GW receives the Hello packet "X,1", the node device X may determine that "a bypass route is not present".

However, when the node GW subsequently receives the Hello packet "X,1", information indicating that a bypass route is present is reported from the node GW to the node X. Accordingly, the node device X gives priority to the report from the node GW over the decision based on the Hello packet "X,2" and determines that a bypass route is present for data transmission to the node GW. Therefore, according to the method for searching for a bypass route of the embodiment, the presence/absence of a bypass route can be precisely determined.

<Flowcharts>

Figure 25:
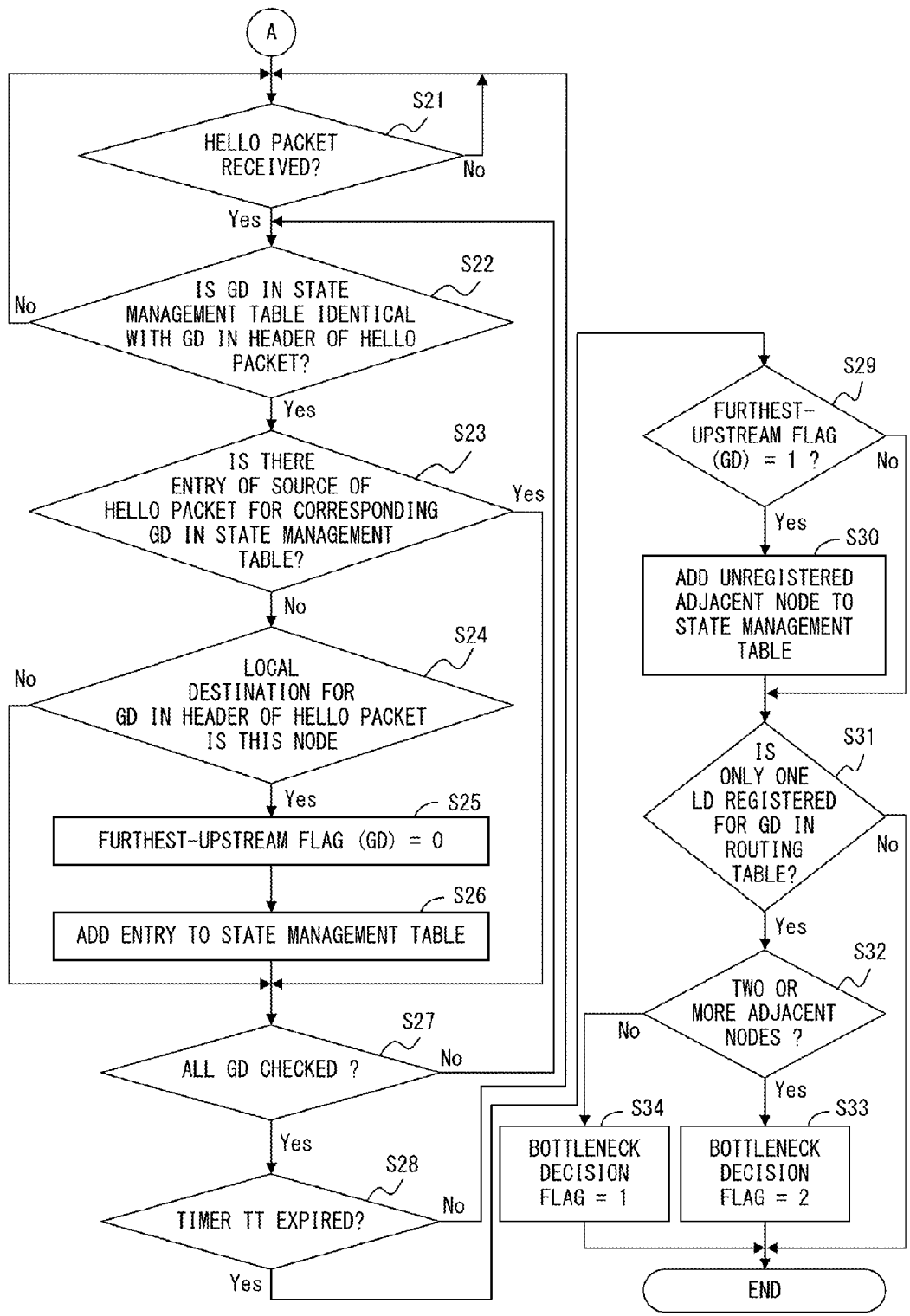

FIG. 24 and FIG. 25 are flowcharts illustrating a bottleneck candidate decision process. The bottleneck candidate decision process is performed by the decision unit 35 at each node device. The bottleneck candidate decision process includes a process of creating the state management table 23 and a process of deciding whether a node is a furthest-upstream node. In addition, the bottleneck candidate decision process is, for example, periodically performed as illustrated in FIG. 9.

In step S11, the decision unit 35 initializes a bottleneck decision flag. The initial value of the bottleneck decision flag is "0: non-bottleneck". The bottleneck decision flag is stored in the bottleneck-decision-flag memory 24. In addition to "0: non-bottleneck", the bottleneck decision flag may be updated to "1: singly isolated", "2: bottleneck candidate", and "3: decided to be bottleneck".

In step S12, the decision unit 35 initializes a furthest-upstream flag. The initial value of the furthest-upstream flag is "1: furthest upstream". The furthest-upstream flag is stored in the furthest-upstream-flag memory 25. The furthest-upstream flag is prepared for each global destination GD.

In step S13, the decision unit 35 creates a state management table 23. At this moment, however, an adjacent node is not entered in the state management table 23. As an example, for the node device X, the state management table 23 illustrated in FIG. 26A is created in step S13. In the example illustrated in FIG. 26A, "global destination: GW", "local destination: Y", and "search target node: X" are registered. At this moment, only the node itself (i.e., the node X) is registered in the field "adjacent node".

In step S14, the decision unit 35 starts a timer TT that counts a period during which an adjacent node is registered in the state management table 23. The period counted by the timer TT is not particularly limited but, for example, is sufficiently long with respect to intervals at which each node device transmits a Hello packet.

Until the timer TT expires, the decision unit 35 registers an adjacent node in the state management table 23 in steps S21-S28. In this case, the decision unit 35 may register in the state management table 23 only an adjacent node that selects as a local destination the node that includes this decision unit

35. The decision unit 35 also determines whether or not the node device is a furthest-upstream node with respect to the global destination GD.

In step S21, the decision unit 35 waits for a Hello packet transmitted from an adjacent node. Each node device periodically broadcasts a Hello packet. Upon receipt of the Hello packet, the decision unit 35 compares in step S22 the global destination GD registered in the state management table 23 with the global destination GD written in the header of the Hello packet. When these two global destinations GD are identical with each other, the process of the decision unit 35 moves to step S23. Meanwhile, when these two global destinations GD are not identical with each other, the process of the decision unit 35 returns to step S21 to wait for a next Hello packet.

In step S23, the decision unit 35 checks whether or not the source node of the Hello packet has already been registered for the global destination GD in the state management table 23. When the source node of the Hello packet has not yet been registered in the state management table 23, the process of the decision unit 35 moves to step S24. Meanwhile, when the source node of the Hello packet has already been registered in the state management table 23, steps S24-S26 are skipped.

In step S24, the decision unit 35 checks whether or not a local destination LD that is written in the header of the Hello packet and that is optimum for the global destination GD is the node that includes this decision unit 35. That is, the decision unit 35 checks whether or not the source node of the Hello packet has selected the node that includes this decision unit 35 as a local destination LD in transmitting data to the global destination GD. When the local destination LD is the node that includes this decision unit 35, the process of the decision unit 35 moves to step S25. Meanwhile, when the local destination LD is not the node that includes this decision unit 35, steps S25 and S26 are skipped. An adjacent node that selects the node device that includes this decision unit 35 as a local destination LD in data transmission to the global destination GD may hereinafter be referred to as a "particular adjacent node".

In step S25, the decision unit 35 sets a furthest-upstream flag that corresponds to the global destination GD to "0: not furthest-upstream". In this case, when the furthest-upstream flag stored in the furthest-upstream-flag memory 25 is "1", the decision unit 35 updates this furthest-upstream flag from "1" to "0".

In step S26, the decision unit 35 adds the source node of the Hello packet to an entry in the state management table 23 that corresponds to the global destination GD.

Step S27 is provided such that, when route information is stored in the Hello packet for a plurality of global destinations GD, steps S22-S26 are performed for each of the global destinations GD. When the timer TT expires in step S28, the process of the decision unit 35 moves to step S29.

In the example illustrated in FIG. 25, the particular adjacent node is registered in the state management table 23. However, the method for creating the state management table 23 is not limited to this procedure. As an example, the decision unit 35 may register in the state management table 23 all adjacent nodes including the particular adjacent node. In this case, however, the decision unit 35 registers each adjacent node in the state management table 23 in a manner such that it is possible to distinguish between the particular adjacent node and the other adjacent nodes.

In steps S21-S28, the decision unit 35 determines whether or not the node that includes this decision unit 35 is a furthest-upstream node with respect to the global destination GD. In the process of receiving Hello packets from adjacent nodes, the decision unit 35 performs step S25 when at least one adjacent node is the particular adjacent node. That is, when there are one or more adjacent nodes that select a node as a local destination LD in data transmission to the global destination GD, it is determined that this node is not a furthest-upstream node. In other words, when there is no adjacent node that selects a node as a local destination LD in data transmission to the global destination GD, the decision unit 35 of this node determines that this node is a furthest-upstream node.

In step S29, the decision unit 35 checks whether or not the node that includes this decision unit 35 is a furthest-upstream node. In this case, the decision unit 35 references the furthest-upstream flag stored in the furthest-upstream-flag memory 25. When the node is a furthest-upstream node, the decision unit 35 of this node performs step S30. In step S30, the decision unit 35 references the link table 21 and adds an adjacent node that has not been registered in the state management table 23, if any, to the state management table 23. Meanwhile, when the node is not a furthest-upstream node, step S30 is skipped.

In this way, through steps S29 and S30, all of the adjacent nodes are registered in the state management table 23 of the furthest-upstream node. When all of the adjacent nodes are registered in the state management table 23 during steps S21-S28, steps S29 and S30 do not need to be performed.

In step S31, the decision unit 35 checks whether or not only one local destination LD for the global destination GD that is a search target is registered in the routing table 22. The processes of the decision unit 35 end when a plurality of corresponding local destinations LD are registered in the routing table 22. In this case, the bottleneck decision flag is not updated and remains as "0: non-bottleneck". That is, when a plurality of local destinations LD corresponding to the global destination GD are registered in the routing table 22, the decision unit 35 determines that there is a bypass route to the global destination GD.

When only one corresponding local destination ID is registered in the routing table 22, the decision unit 35 checks in step S32 whether or not two or more adjacent nodes are present. When two or more adjacent nodes are present, the decision unit 35 updates in step S33 the bottleneck decision flag to "2: bottleneck candidate". That is, when there is only one local destination LD for the global destination GD and there are a plurality of adjacent nodes, the decision unit 35 determines that the node that includes this decision unit 35 is a bottleneck candidate. Meanwhile, when only one adjacent node is present, the decision unit 35 updates in step S34 the bottleneck decision flag to "1: singly isolated".

Next, with reference to the ad-hoc network illustrated in FIG. 10 or FIG. 14, the procedures of the flowcharts in FIG. 24 and FIG. 25 will be described. The nodes X, A, D and F will be described in the following.

As illustrated in FIG. 14, the node X is designated by the nodes A, B and C as a local destination in data transmission to the node GW. Thus, upon receipt of Hello packets from the adjacent nodes A, B and C, the decision unit 35 of the node X adds in step S26 the nodes A, B and C to the state management table 23. FIG. 26B depicts the state management table 23 of the node X in which the nodes A, B and C are added. In this case, the nodes A, B and C are registered in the state management table 23 as particular adjacent nodes.

As described above, since there are adjacent nodes that designate the node X as a local destination in data transmission to the node GW, the decision unit 35 of the node X updates in step S25 the furthest-upstream flag to "0". That is, the decision unit 35 of the node X determines that the node X is not a furthest-upstream flag in data transmission to the node GW.

Moreover, only one local destination LD for "global destination GD: node GW" is registered in the routing table 22X of the node X, as illustrated in FIG. 10 or FIG. 14. Thus, a judgment of "Yes" is obtained in step S31. In addition, since the node X has four adjacent nodes, a judgment of "Yes" is obtained in step S32. Accordingly, in step S33, the decision unit 35 updates the bottleneck decision flag to "2". That is, it is determined that the node X is a bottleneck candidate.

As illustrated in FIG. 14, the node A is designated by the node D as a local destination in data transmission to the node GW. Thus, the decision unit 35 of the node A updates in step S25 the furthest-upstream flag to "0". That is, it is also determined that the node A is not a furthest-upstream node in data transmission to the node GW.

Two local destinations LD for "global destination GD: node GW" are registered in the routing table 22A of the node A, as illustrated in FIG. 10 or FIG. 14. Thus, a judgment of "No" is obtained in step S31. That is, since the decision unit 35 of the node A does not perform steps S32-S34, it is determined that the node A is a non-bottleneck.

As illustrated in FIG. 14, the node D is not designated by any nodes as a local destination in data transmission to the node GW. Thus, step S25 is not performed at the node D, and the furthest-upstream flag remains as "1". That is, it is determined that the node D is a furthest-upstream node with respect to the node GW. In addition, two local destinations LD are registered for "global destination GD: node GW" in the routing table 22D of the node D as illustrated in FIG. 10 or FIG. 14. Accordingly, it is determined that the node D is a non-bottleneck.

As illustrated in FIG. 10, the node F is adjacent only to the node E. In addition, only one local destination LD is registered for "global destination GD: node GW" in the routing table 22F of the node F as illustrated in FIG. 10. Thus, a judgment of "Yes" is obtained in step S31. Since the node F has only one adjacent node, a judgment of "No" is obtained in step S32. Accordingly, the decision unit 35 of the node F updates the bottleneck decision flag to "1". That is, it is determined that the node F is singly isolated.

Figure 27:
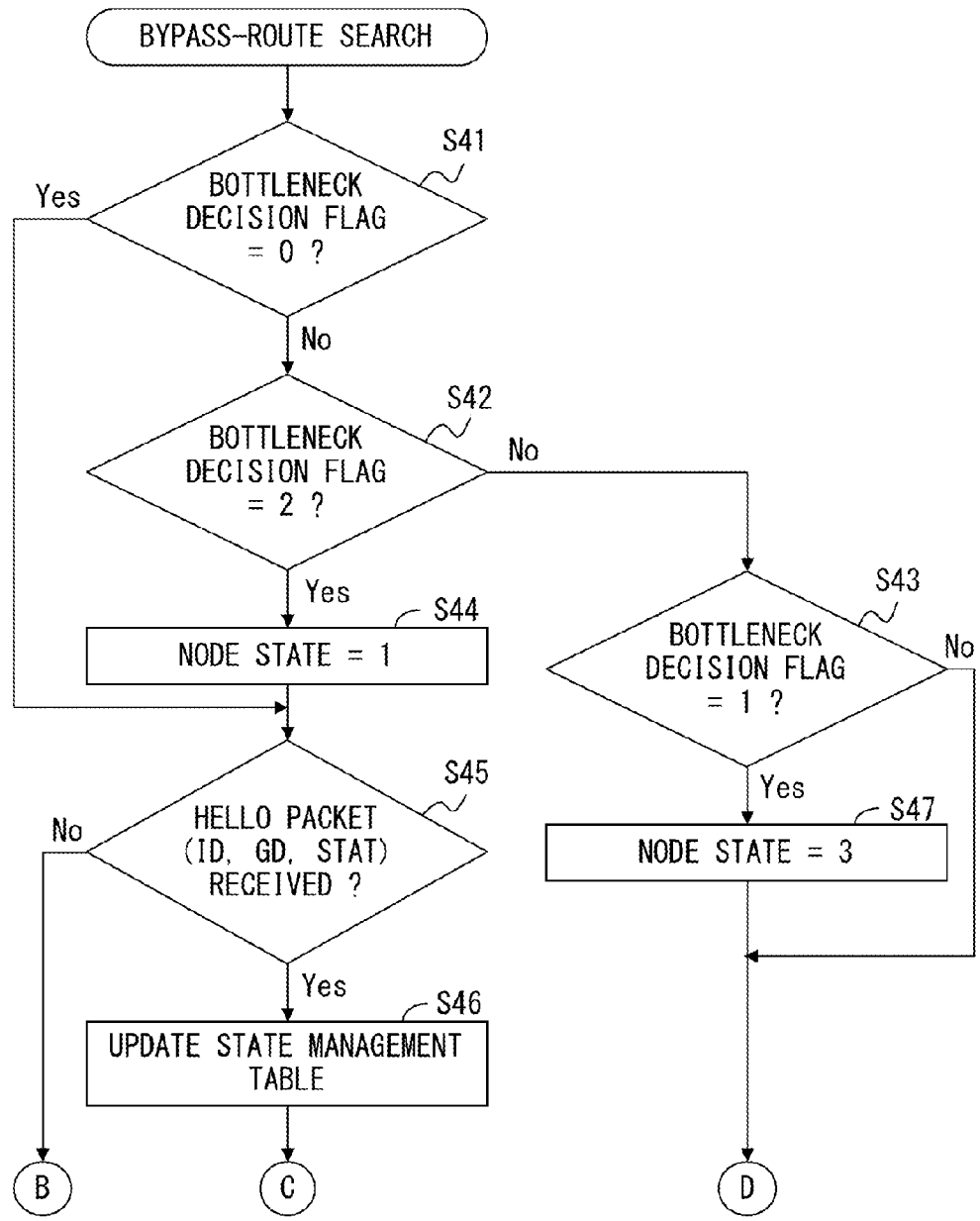
FIGS. 27-29 are flowcharts illustrating a bypass route searching process.
Figure 28:
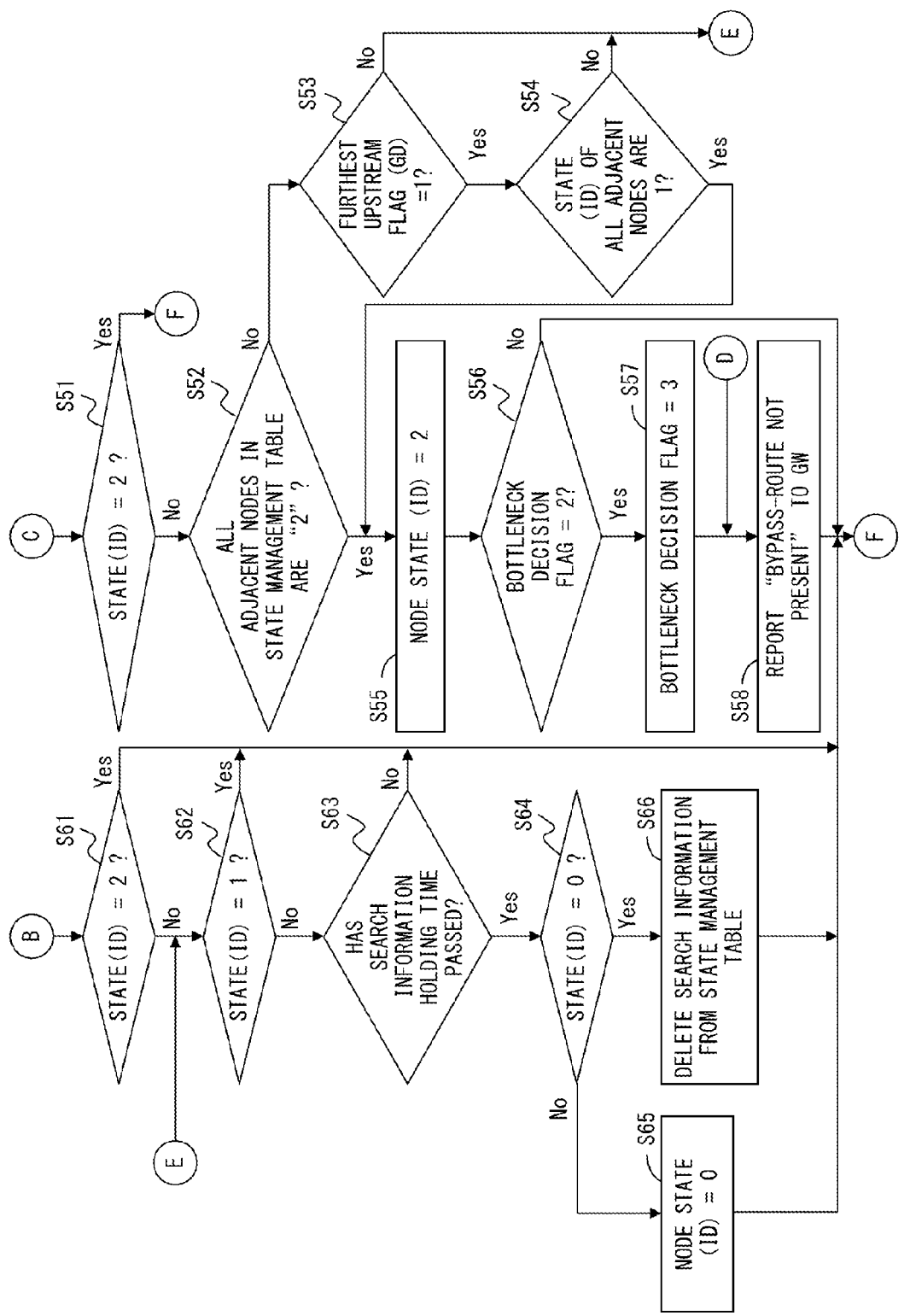
Figure 29:
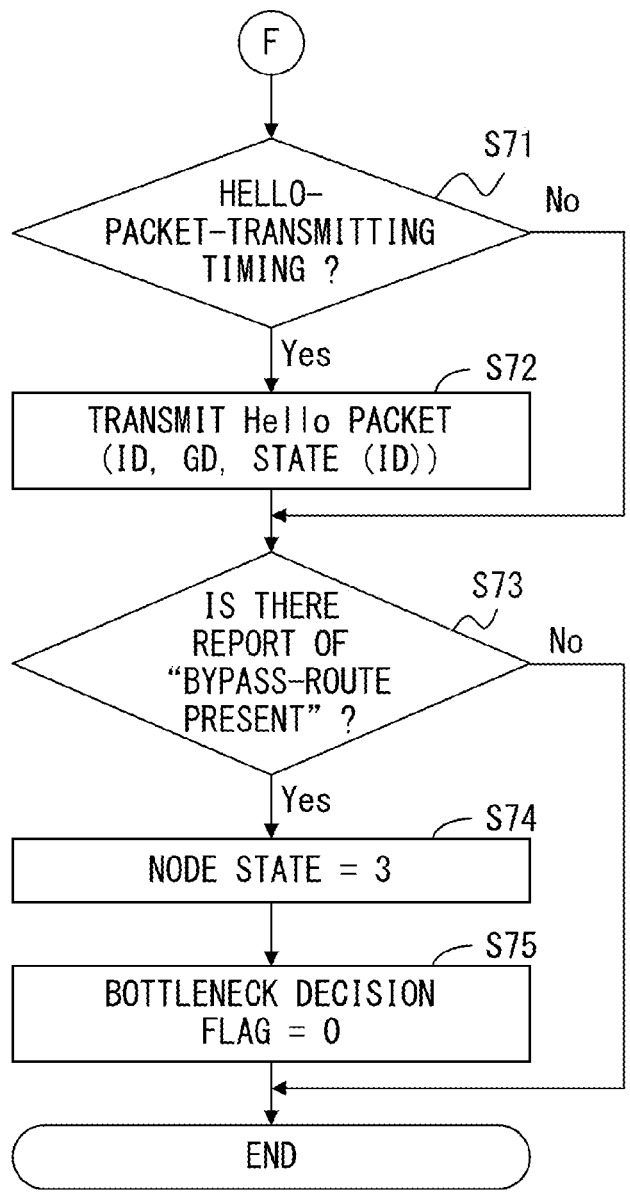

FIGS. 27-29 are flowcharts illustrating a bypass route searching process. The bypass route searching process is performed by the decision unit 35 at each node device. However, a portion of the bypass route searching process is performed by the packet generator 33 and the packet transmitter 34. Moreover, as illustrated in, for example, FIG. 9, the bypass route searching process is continuously or repeatedly performed while the ad-hoc network is in operation.

In the flowcharts illustrated in FIGS. 27-29, "ID" identifies a search target node; in particular, "ID" identifies a bottleneck candidate node. While the ad-hoc network is making a bypass route search, each node device periodically broadcasts a Hello packet that includes search information to an adjacent node. The search information corresponds to "search target node" and "node state" in FIG. 8. In FIGS. 27-29, "search target node" and "node state" are respectively indicated as "ID" and "STATE".

In steps S41-S43, the decision unit 35 detects the value of a bottleneck decision flag. The bottleneck decision flag is determined in the flowcharts illustrated in FIGS. 24-25 and is stored in the bottleneck-decision-flag memory 24.

When the bottleneck decision flag is "2: bottleneck candidate", the decision unit 35 updates in step S44 the state of the node to "1: searching process". That is, the node device decided to be a bottleneck candidate starts the bypass route searching process on the assumption that this node device itself is a search target.

In step S45, the decision unit 35 waits for a Hello packet. Each node device on the ad-hoc network periodically transmits a Hello packet to an adjacent node. As illustrated in FIG. 8, the Hello packet includes "GD" indicating a global destination, "ID" identifying a target node in the bypass route search, and "STATE" indicating the state of the node device. When the node device receives a Hello packet, the process of the decision unit 35 moves to step S46. Meanwhile, when the node device does not receive a Hello packet, the process of the decision unit 35 moves to step S61.

In step S46, the decision unit 35 updates the state management table 23 according to the content of the received Hello packet. In this case, the decision unit 35 updates the node state in the entry corresponding to the global destination GD and the search target node (ID), both of which are written in the Hello packet. As an example, upon receipt of the Hello packet that includes "STATE=1", the decision unit 35 updates the state of the node that includes this decision unit 35 and the state of the source node of the Hello packet to "1". Upon receipt of the Hello packet that includes "STATE=2", the decision unit 35 updates the state of the source node of the Hello packet to "2". Upon receipt of the Hello packet that includes "STATE=0" or "STATE=3", the decision unit 35 starts a search-information-holding-time timer.

The processes of steps S51-S58 and steps S61-S66 are performed for each search target node. That is, when a plurality of bottleneck candidates are present in the ad-hoc network, the processes of steps S51-S58 and steps S61-S66 are performed for each bottleneck candidate.

In step S51, the decision unit 35 checks whether or not the state of the node that includes this decision unit 35 is "2". When the state of the node device is not "2", the process of the decision unit 35 moves to step S52. Meanwhile, when the state of the node device is "2", steps S52-S58 are skipped, and the process of the decision unit 35 moves to step S71. That is, when the state of the node device has already been decided to be "bypass-route not present", steps S52-S58 are not performed.

In step S52, the decision unit 35 checks whether or not the states of all particular adjacent nodes registered in the state management table 23 are "2". When the states of all particular adjacent nodes are "2", the process of the decision unit 35 moves to step S55. Meanwhile, when there is a particular adjacent node whose state is not "2", the process of the decision unit 35 moves to step S53.

In step S53, the decision unit 35 checks whether or not a furthest-upstream flag that corresponds to a global destination related to the bypass route search is "1". That is, the decision unit 35 checks whether or not the node that includes this decision unit 35 is a furthest-upstream node with respect to the global destination GD. The furthest-upstream flag is stored in the furthest-upstream-flag memory 25. When the furthest-upstream flag is "1", the process of the decision unit 35 moves to step S54. Meanwhile, when the furthest-upstream flag is not "1", the process of the decision unit 35 moves to step S62.

In step S54, the decision unit 35 checks whether or not the states of all adjacent nodes registered in the state management table 23 are "1". When the states of all of the adjacent nodes are "1", the process of the decision unit 35 moves to step S55. Meanwhile, when there is an adjacent node whose state is not "1", the process of the decision unit 35 moves to step S62.

In step S55, the decision unit 35 updates the state of the node that includes this decision unit 35 to "2: bypass-route not present". That is, in the furthest-upstream node, the decision unit 35 updates the state of the node that includes this decision unit 35 to "2" when the states of all of the adjacent nodes registered in the state management table are "1". By contrast, in the nodes other than the furthest-upstream node, the decision unit 35 updates the state of the node that includes this decision unit 35 to "2" when the states of all of the particular adjacent nodes registered in the state management table 23 are "2".

In step S56, the decision unit 35 checks whether or not the bottleneck decision flag is "2". When the bottleneck decision flag is "2", the decision unit 35 updates in step S57 the bottleneck decision flag from "2" to "3: decided to be bottleneck". That is, the decision unit 35 determines that the node that includes this decision unit 35 is a bottleneck. In addition, in step S58, the decision unit 35 reports to the global destination (in this example, the node GW) that a bypass route is not present in data transmission to the global destination. In this way, when the node device that is a bottleneck candidate determines that the node device itself is a bottleneck, this node device reports to the global destination node that a bypass route is not present.

Step S61 is performed when a Hello packet is not received in step S45. In step S61, the decision unit 35 checks whether or not the state of the node that includes this decision unit 35 is "2". When the state of the node device is not "2", the process of the decision unit 35 moves to step S62. When the state of the node device is "2", steps S62-S66 are skipped, and the process of the decision unit 35 moves to step S71. That is, when the state of the node device has already been decided to be "bypass-route not present", steps S62-S66 are not performed.

In step S62, the decision unit 35 checks whether or not the state of the node that includes this decision unit 35 is "1". When the state of the node device is not "1", the process of the decision unit 35 moves to step S63. When the state of the node device is "1", steps S63-S66 are skipped, and the process of the decision unit 35 moves to step S71. Note that step S62 is also performed when a judgment of "No" is obtained in step S53 or S54.

In step S63, the decision unit 35 checks whether or not the search-information-holding time has passed. The search-information-holding time is counted by the timer started in step S46. That is, the decision unit 35 checks whether or not the search-information-holding time has passed since reception of the Hello packet that includes "STATE=0" or "STATE=3". When the search-information-holding time has passed, the process of the decision unit 35 moves to step S64. Meanwhile, when the search-information-holding time has not passed, the process of the decision unit 35 moves to step S71.

In step S64, the decision unit 35 checks whether or not the state of the node that includes this decision unit 35 is "0". When the state of the node device is not "0", the process of the decision unit 35 moves to step S65. Meanwhile, when the state of the node device is "0", the process of the decision unit 35 moves to step S66.

In step S65, the decision unit 35 updates the state of the node that includes this decision unit 35 to "0: initial state". Step S65 is performed when a judgment of "No" is obtained in steps S61, S62 and S64. That is, step S65 is performed when the state of the node is "3: bypass-route present". In other words, after the search-information-holding time has passed and the decision unit 35 determines that a bypass route is present, the decision unit 35 initializes the state of the node that includes this decision unit 35.

In step S66, the decision unit 35 deletes from the state management table 23 the search information corresponding to the global destination of a search target. Here, step S66 is performed when the state of the node that includes this decision unit 35 is "0: initial state". In other words, after the search-information-holding time has passed and the decision unit 35 initializes the state of the node that includes this decision unit 35, the decision unit 35 deletes the search information from the state management table 23.

In this way, in steps S51-S58 and steps S61-S66, the decision unit 35 updates the state management table 23 according to the content of the received Hello packet. The decision unit 35 of a bottleneck-candidate node determines whether or not this node is a bottleneck.

In step S71, the decision unit 35 checks whether or not a current time is a transmission timing of a Hello packet. In order to periodically transmit a Hello packet to an adjacent node, the node device includes, for example, a timer to report the transmission timing to the packet generator 33 and the packet transmitter 34. In step S72, upon report of the transmission timing at which a Hello packet is transmitted, the packet generator 33 generates a Hello packet, and the packet transmitter 34 transmits this Hello packet to an adjacent node. In this case, "search target node" and "node state (STATE)" stored in the state management table 23 are respectively written in "search target node" and "node state" of the Hello packet. When a plurality of global destinations and/or a plurality of search target nodes are registered in the state management table 23, a plurality of sets of search information are added to the Hello packet. Step S72 is skipped when the current time is not the transmission timing at which the Hello packet is transmitted.

After the search information is deleted from the state management table 23 in step S66, the packet generator 33 generates in step S72 a Hello packet to which "search target node" and "node state" are not added. However, even after the search information is deleted from the state management table 23, the packet generator 33 may generate a Hello packet to which "search target node" and "node state" are added. In this case, as an example, the packet generator 33 may write, in "search target node" and "node state", a value representing that there is no information (e.g., all zeros).

In step S73, the decision unit 35 checks whether or not information that indicates "bypass-route present" has been received from the global destination node (in this example, from the node GW). Note that upon receipt of a Hello packet that includes "STATE=1", the global destination node transmits to the search target node information that indicates "bypass-route present". As an example, in the example illustrated in FIG. 22, upon receipt of the Hello packet "X,1", the node device GW transmits to the node X the information that indicates "bypass-route present".

Upon receipt of the information that indicates "bypass-route present", the decision unit 35 updates in step S74 the state of the node that includes this decision unit 35 to "3: bypass-route present". Subsequently, the decision unit 35 updates in step S75 the bottleneck decision flag to "0: non-bottleneck". When the information that indicates "bypass-route present" has not been received, the decision unit 35 skips the processes of steps S74 and S75.

When the bottleneck decision flag is "3: decided to be bottleneck", a judgment of "No" is obtained in steps S41-S43. In this case, the process of the decision unit 35 moves to step S58. In step S58, the decision unit 35 reports to the global destination (in this example, the node GW) the information that indicates "bypass-route not present".

Operations performed by the decision unit 35 when the bottleneck decision flag is "1: singly isolated" are substantially the same as those performed when the bottleneck decision flag is "3". However, when the bottleneck decision flag is "1", the decision unit 35 updates in step S47 the state of the node that includes this decision unit 35 to "3".

Next, procedures of the flowcharts illustrated in FIGS. 27-29 will be described with reference to the examples illustrated in FIGS. 16-23.

(A) Operations of Node Device X in FIG. 16

The bottleneck decision flag of the node X is "2: bottleneck candidate". Thus, a judgment of "Yes" is obtained in step S42, and the decision unit 35 updates in step S44 the state of the node X to "1: searching process". Assume that the node X has not received a Hello packet. In this case, a judgment of "Yes" is obtained in step S62, and the node device X transmits in step S72 a Hello packet to adjacent nodes. In this case, "node GW", "node X" and "1" are respectively written in "global destination", "search target node", and "state" of the Hello packet. That is, the node device X transmits a Hello packet "X,1" to the adjacent nodes.

(B) Operations of Node Device A in FIGS. 17-18

The bottleneck decision flag of the node A is "0: non-bottleneck". The node device A receives a Hello packet "X,1" from the node X. Accordingly, the decision unit 35 updates the state management table 23A in step S46. In particular, the decision unit 35 updates the state of the node A to "1" in the entry corresponding to "global destination: GW" and "search target: X" of the state management table 23A. Subsequently, a judgment of "No" is obtained in steps S51, S52 and S53, and a judgment of "Yes" is obtained in step S62. Thus, similar to the node device X, the node device A also transmits in step S72 the Hello packet "X,1" to the adjacent nodes. Note that operations performed by the node devices B and C, which receive the Hello packet "X,1" from the node X, are substantially the same as those by the node device A.

(C) Operations of Node Device D in FIGS. 19-20

The bottleneck decision flag of the node D is "0: non-bottleneck". The node D is a furthest-upstream node. The node device D receives the Hello packets "X,1" from the nodes A and B. Accordingly, the decision unit 35 of the node D updates the state management table 23D in step S46. In particular, for the entries corresponding to "global destination: GW" and "search target: X" of the state management table 23D, the decision unit 35 updates the state of the node D to "1" and also updates the states of the nodes A and B to "1".

Then, since a judgment of "No" is obtained in steps S51 and S52 and a judgment of "Yes" is obtained in step S53, the process of the decision unit 35 moves to step S54. In this case, the states of the nodes A and B are both "1" in the entries corresponding to "global destination: GW" and "search target: X" of the state management table 23D of the node D. Accordingly, a judgment of "Yes" is obtained in step S54.

Subsequently, the decision unit 35 of the node device D updates in step S55 the state of the node D to "2" in the entry corresponding to "global destination: GW" and "search target: X" in the state management table 23D. The node device D transmits a Hello packet to adjacent nodes. In this case, "node GW", "node X" and "2" are respectively written in "global destination", "search target node" and "state" of the Hello packet. That is, the node device D transmits a Hello packet "X,2" to the adjacent nodes. Operations performed by the node device E, which receives the Hello packet "X,1" from each of the nodes B and C, are substantially the same as those by the node device D. Operations performed by the node device C, which receives the Hello packet "X,1" from each of the nodes X, B and E, are also substantially the same as those by the node device D.

(D) Operations of Node Device A in FIG. 21

The node device A receives the Hello packets "X,2" from adjacent nodes. As illustrated in FIG. 14, the node D is the only node that selects the node A as an optimum local destination in data transmission to the node GW. Thus, only the node D is registered as a particular adjacent node in the entry corresponding to "global destination: GW" and "search target: X" of the state management table 23A of the node A.

When the node device A receives the Hello packet "X,2" from the node D, the decision unit 35 updates the state management table 23A in step S46. In particular, the decision unit 35 updates the state of the node D to "2" in the entry corresponding to "global destination: GW" and "search target: X" of the state management table 23A. At this moment, the state of the node A is still "1". Thus, a judgment of "No" is obtained in step S51, and step S52 is performed.

In step S52, the decision unit 35 of the node A searches the entries corresponding to "global destination: GW" and "search target: X" of the state management table 23A. In this case, since the state of the node D that is a particular adjacent node of the node A is "2", the process of the decision unit 35 moves to step S55. In step S55, the decision unit 35 updates the state of the node A to "2" in the entry corresponding to "global destination: GW" and "search target: X" of the state management table 23A.

In step S56, the decision unit 35 of the node A checks the bottleneck decision flag. The bottleneck decision flag of the node A is "0" as described above. Thus, a judgment of "No" is obtained in step S56, and steps S57 and S58 are skipped.

Then, the node device A transmits in step S72 a Hello packet to the adjacent nodes. "node GW", "node X", and "2" are respectively written in "global destination", "search target node", and "state" of the Hello packet. That is, the node device A transmits a Hello packet "X,2" to the adjacent nodes. Operations performed by the node device B, which receives the Hello packet "X,2" from the node E, are substantially the same as those by the node device A.

(E) Operations of Node Device X in FIG. 21

The node device X receives the Hello packets "X,2" from adjacent nodes. As illustrated in FIG. 14, the nodes A, B and C select the node X as an optimum local destination in data transmission to the node GW. Thus, the nodes A, B and C are registered as particular adjacent nodes in the entries corresponding to "global destination: GW" and "search target: X" of the state management table 23X of the node X.

When the node device X receives the Hello packets "X,2" from the nodes A, B and C, the decision unit 35 updates the state management table 23X in step S46. In particular, the decision unit 35 updates the states of the nodes A, B and C to "2" in the entries corresponding to "global destination: GW" and "search target: X" of the state management table 23X. At this moment, the state of the node X is still "1". Thus, a judgment of "No" is obtained in step S51, and step S52 is performed.

In step S52, the decision unit 35 of the node X searches the entries corresponding to "global destination: GW" and "search target: X" of the state management table 23X. In this case, since the states of all of the nodes A, B and C are "2", the process of the decision unit 35 moves to step S55. In step S55, the decision unit 35 updates the state of the node X to "2" in the entry corresponding to "global destination: GW" and "search target: X" of the state management table 23X.

In step S56, the decision unit 35 of the node X checks the bottleneck decision flag. The bottleneck decision flag of the node X is "2: bottleneck candidate" as described above. Thus, a judgment of "Yes" is obtained in step S56, and steps S57 and S58 are performed.

In step S57, the decision unit 35 of the node X updates the bottleneck decision flag to "3: decided to be bottleneck". That is, the decision unit 35 of the node X determines that the node X is a bottleneck. Accordingly, in step S58, the decision unit 35 reports to the node GW the information indicating that a bypass route is not present in data transmission to the node GW.

(F) Operations of Node Device X in FIGS. 22-23

As illustrated in FIG. 22, upon receipt of a Hello packet "X,1", a gateway device (the node GW) determines that a bypass route is present between the node X and the gateway device. Then, the gateway device reports to the node X the information indicating "bypass-route present".

The node device X receives from the gateway device (the node GW) the information indicating "bypass-route present". In this case, a judgment of "Yes" is obtained in step S73, and the decision unit 35 of the node X performs steps S74 and S75. That is, the decision unit 35 updates in step S74 the state of the node X to "3: bypass-route present". Moreover, the decision unit 35 updates in step S75 the bottleneck decision flag to "0: non-bottleneck". In addition, although not particularly illustrated, the decision unit 35 starts a timer to count the search-information-holding time.

Then, the decision unit 35 repeatedly performs the processes of steps S41-S75 until the search-information-holding time passes. Since the state of the node X is "3", the node device X transmits in step S72 a Hello packet to adjacent nodes. "node GW", "node X", and "3" are respectively written in "global destination", "search target node", and "state" of the Hello packet.

Upon the passage of the search-information-holding time (step S63: Yes), the decision unit 35 of the node X updates in step S65 the state of the node X to "0: initial state". Then, in step S66, the decision unit 35 deletes information of the entries corresponding to "global destination: GW" and "search target: X" of the state management table 23X.

(G) Operations of Node Device A in FIGS. 22-23

When the node device A receives a Hello packet "X,3" from the node X, in step S46, the decision unit 35 of the node A updates the state of the node A to "3" and starts a timer to count the search-information-holding time. Remaining operations performed by the node device A are substantially the same as those performed by the node device X described above in (F). That is, the node device A transmits the Hello packet "X,3" to adjacent nodes. After this, upon the passage of a specified period of time, the decision unit 35 deletes corresponding search information from the state management table 23A. Operations performed by each node device when it receives the Hello packet "X,3" are substantially the same as those performed by the node device A.

As described above, in the bypass route searching method in accordance with the embodiment, it is examined whether or not search data (in the example, the Hello packet "X,1") transmitted from a specified node (in the example, a bottleneck candidate node) propagates to a final destination. Thus, it can be precisely determined whether or not data is transmitted to a final destination node without going through the specified node, i.e., whether or not a bypass route is present.

In the bypass route searching method in accordance with the embodiment, bottleneck decisions are not made for all nodes in an ad-hoc network, but bottleneck decisions are made for only some nodes (i.e., bottleneck candidates). Thus, even in a network with many nodes, it does not take a long time to find a bottleneck. As a result, even in a wireless network with links between nodes in an unstable state, a bottleneck node can be precisely detected.

<Another Embodiment>

The bypass route searching method of the flowchart illustrated in FIG. 9 includes a procedure for finding a bottleneck candidate and a procedure for performing a bypass route search for the bottleneck candidate. However, the bypass route searching method in accordance with the invention is not limited to the method indicated by the flowchart. As an example, in the flowcharts illustrated in FIG. 24 and FIG. 25, when a node device is a bottleneck candidate, this node device may determine that a bypass route is not present in data transmission to a global destination.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A wireless communication device used in a wireless network that includes a plurality of wireless communication devices, the wireless communication device comprising:
   a processor; and
   a memory, wherein
   each of the plurality of wireless communication devices has its own routing table that stores routing information to indicate a local destination of data with respect to a final destination device,
   each of the plurality of wireless communication devices informs the routing information stored in its own routing table to its adjacent devices,
   the processor detects, based on the routing information informed from the adjacent devices of the wireless communication device, a particular adjacent device from among the plurality of wireless communication devices that is adjacent to the wireless communication device and that transmits, to the wireless communication device, data addressed to the final destination device,
   the processor stores identification information that identifies the detected particular adjacent device in the memory,
   the processor generates search data that includes information indicating a search of a route to the final destination device,
   the processor broadcasts the search data to adjacent devices, and
   the processor decides that a bypass route from the particular adjacent device to the final destination device is not present when data that includes information indicating that the search data does not reach the final destination device is received from all particular adjacent devices for which identification information is stored in the memory.

2. The wireless communication device according to claim 1, wherein
the processor broadcasts the search data to adjacent devices when all adjacent devices other than an adjacent device selected by the wireless communication device as a destination adjacent device in data transmission to the final destination device are the particular adjacent devices.

3. The wireless communication device according to claim 1, wherein
the processor adds the search data to the report data so as to broadcast the search data together with report data including route information used to transmit data to the final destination device to the adjacent devices.

4. The wireless communication device according to claim 1, wherein
the processor decides that a bypass route from the particular adjacent device to the final destination device is present when a report indicating that the search data has reached the final destination device is received from the final destination device.

5. The wireless communication device according to claim 1, wherein
the processor broadcasts, to the adjacent device, data indicating a result of a decision made by the processor.

6. The wireless communication device according to claim 1, wherein
when the search data that includes information indicating a search of a route to the final destination device is received from the adjacent device and the memory does not store the identification information identifying a particular adjacent device, the processor broadcasts, to the adjacent node, data that includes information indicating that the search data does not reach the final-destination device.

7. The wireless communication device according to claim 1, wherein
when the search data that includes information indicating a search of a route to the final destination device and that has been generated by the particular adjacent device is received from the adjacent device, the processor does not broadcast the search data.

8. A bypass route search method used by a wireless communication device in a wireless network that includes a plurality of wireless communication devices, wherein
each of the plurality of wireless communication devices has its own routing table that stores routing information to indicate a local destination of data with respect to a final destination device,
each of the plurality of wireless communication devices informs the routing information stored in its own routing table to its adjacent devices, and the method comprises:
detecting, based on the routing information informed from the adjacent devices of the wireless communication device, a particular adjacent device from among the plurality of wireless communication devices that is adjacent to the wireless communication device and that transmits, to the wireless communication device, data addressed to a final destination device;
generating search data that includes information indicating a search of a route to the final destination device;
broadcasting the search data to the adjacent devices; and
determining that a bypass route from the particular adjacent device to the final destination device is not present when data that includes information indicating that the search data does not reach the final destination device is received from all of the particular adjacent devices.

9. A bypass route search method used in a wireless network that includes a plurality of wireless communication devices, wherein
each of the plurality of wireless communication devices has its own routing table that stores routing information to indicate a local destination of data with respect to a final destination device,
each of the plurality of wireless communication devices informs the routing information stored in its own routing table to its adjacent devices, and the method comprises:
detecting, based on the routing information informed from the adjacent devices of the wireless communication device, at a search-target wireless communication device, a particular adjacent device from among the plurality of wireless communication devices that is adjacent to the search-target wireless communication device and that transmits, to the search-target wireless communication device, data addressed to a final destination device;
generating, at the search-target wireless communication device, search data that includes information indicating a search of a route to the final destination device; and
broadcasting the search data from the search-target wireless communication device to adjacent devices of the search-target wireless communication device, wherein
each wireless communication device that receives the search data broadcasts the search data to an adjacent device,
upon receipt of the search data, a furthest-upstream device with respect to the final destination device broadcasts, to an adjacent device, response data that includes information indicating that the search data does not reach the final destination device,
each wireless communication device that receives the response data broadcasts the response data to an adjacent device, and
upon receipt of the response data from all of the particular adjacent devices, the search-target wireless communication device determines that a bypass route from the particular adjacent device to the final destination device is not present.

10. The bypass route search method according to claim 9, wherein
upon receipt of the search data, the final destination device transmits to the search-target wireless communication device a report indicating that the search data has reached the final destination device, and
upon receipt of the report from the final destination device, the search-target wireless communication device determines that a bypass route from the particular adjacent device to the final destination device is present.

11. The bypass route search method according to claim 10, wherein
the search-target wireless communication device broadcasts, to an adjacent device, information indicating that a bypass route is present, and
each of the wireless communication devices other than the search-target wireless communication device does not transmit the search data after a specified period of time has passed since the information indicating that a bypass route is present is received.

12. The wireless communication device according to claim 1, wherein the processor decides that a route from the wireless communication device to the final destination device via the particular adjacent device is not present when the wireless communication device receives response data from all of the particular adjacent devices for which identification information is stored in the memory, wherein the response data includes information indicating that the search data generated by the generator does not reach the final destination device and the search data is returned from a furthest-upstream device with respect to the final destination device to the particular adjacent device.

* * * * *